United States Patent
Kofman et al.

(10) Patent No.: US 7,379,203 B2
(45) Date of Patent: May 27, 2008

(54) DATA CAPTURE DURING PRINT PROCESS

(75) Inventors: Gene I. Kofman, Parkland, FL (US); Josh L. Fabel, Boca Raton, FL (US); Warren M. Fabel, Boca Raton, FL (US)

(73) Assignee: Laser Substrates, Inc., Boca Raton, FL (US)

( * ) Notice: Subject to any disclaimer, the term of this patent is extended or adjusted under 35 U.S.C. 154(b) by 811 days.

(21) Appl. No.: 10/272,161

(22) Filed: Oct. 15, 2002

(65) Prior Publication Data

US 2003/0179400 A1    Sep. 25, 2003

Related U.S. Application Data

(63) Continuation-in-part of application No. 10/172,154, filed on Jun. 14, 2002, now Pat. No. 7,196,808, which is a continuation-in-part of application No. 10/133,100, filed on Apr. 26, 2002, now Pat. No. 7,085,998.

(60) Provisional application No. 60/367,118, filed on Mar. 22, 2002.

(51) Int. Cl.
*G06F 15/00* (2006.01)
*B41B 1/00* (2006.01)

(52) U.S. Cl. ............... 358/1.18; 358/1.13; 358/1.15

(58) Field of Classification Search .......... 358/1.13, 358/1.18, 1, 15; 707/102
See application file for complete search history.

(56) References Cited

U.S. PATENT DOCUMENTS

| | | | | |
|---|---|---|---|---|
| 6,029,182 A | * | 2/2000 | Nehab et al. | 715/523 |
| 6,031,625 A | * | 2/2000 | Sherman et al. | 358/1.18 |
| 6,240,456 B1 | * | 5/2001 | Teng et al. | 709/230 |
| 6,260,044 B1 | * | 7/2001 | Nagral et al. | 707/102 |
| 6,282,524 B1 | | 8/2001 | Kramer | |
| 6,337,743 B1 | | 1/2002 | Brown et al. | |
| 6,549,909 B1 | * | 4/2003 | Yamauchi et al. | 707/102 |
| 6,910,628 B1 | * | 6/2005 | Sehr | 235/384 |
| 2003/0038964 A1 | * | 2/2003 | Ferlitsch | 358/1.15 |

OTHER PUBLICATIONS

"The Printing Process" http://www.microsoft.com/windows2000/en/advanced/help/default.asp?url=/windows2000/en/advanced/help/sag_PRINTconcepts_printing_process.htm.*

(Continued)

*Primary Examiner*—Thomas D. Lee
(74) *Attorney, Agent, or Firm*—Jon A. Gibbons; Fleit Kain Gibbons Gutman Bongini & Bianco P.L.

(57) ABSTRACT

A system, method and computer readable medium for capturing data during a print process. In an embodiment of the present invention, the method on a computer system includes observing a print command issued by an application. Next, a spool file in a condensed format, such as Extended Metafile Format (EMF), is written to a disk in response to the print command. This spool file read, and subsequently an output file is generated based on information in the spool file. The output file is written in EMF format if the output file contains image information. If the output file does not contain image information, the output file is written in text format. Then, the output file is modified to conform to a template. Lastly, the output file that was modified is sent to an output destination, such as a printer.

17 Claims, 28 Drawing Sheets

OTHER PUBLICATIONS

"Print Spooler" http://msdn.microsoft.com/library/default.asp?url=/library/en-us/gdi/prntspol_1xv6.asp.*

"Clipboard Formats" http://msdn.microsoft.com/library/default.asp?url=/library/en-us/winui/winui/windowsuserinterface/dataexchange/clipboard/clipboardformats.asp.*

U.S. Appl. No. 10/133,100, filed Apr. 26, 2002, Kofman et al.

U.S. Appl. No. 10/172,154, filed Jun. 14, 2002, Kofman et al.

MSN Money, "Standard Register and HarrisData Announce Strategic Marketing Alliance to Provide Secure Document Delivery", Dayton, Ohio—(Business Wire)—May 3, 2002, http://news.moneycentral.msn.com/ticker/article.asp?Feed=BW&Date=20020503&ID=1611076&Symbol=US:SR.

http://www.mindgate.com/mindgate.html.

http://www.mindgate.com/print2mail/DataDoorway.html.

* cited by examiner

Invoice

402 — Atek
113 NW 78th Place
Parkland, FL 33067

401, 410

| DATE | INVOICE # |
|---|---|
| 4/9/2001 | 84 |

BILL TO

404

| P.O. NO. | TERMS | PROJECT |
|---|---|---|
|  |  | CollMethod Posting |

406

| QUANTITY | DESCRIPTION | RATE | AMOUNT |
|---|---|---|---|
| 4 | Fixed GL JE corrupted records. Changed wrong company from ID, merged spleted documents. 04/03/2001. | 1.00 | 4.00 |
| 2 | Analysed double posting on Acct 1007 for bad check 121221,121242 in view of Chart of Accounts Period Detail Inquiry results. 04/03/2001. | 1.00 | 2.00 |

408

| | Total | $6.00 |

FIG. 4

702 — Please return this portion with your payment in the envelope provided
704  706

SOLD TO:     DATE:    INV. #    AMOUNT    PAYMENTS    AMOUNT OWED

STATEMENT

Account Number

Statement Date

708

TOTALS:

Laser Substrates, Inc.　　　Please retain this portion for your records　　　Statement Date:
6251-C Park of Commerce Blvd　　　Toll Free: 800-538-4900　　　Account No:
Boca Raton, FL 33487-8202　　710
EIN# 59-2686933　　　　　　　　STATEMENT　712

DATE　　　INVOICE NUMBER　　　AMOUNT　　　PAYMENTS　　　AMOUNT OWED

714

TOTALS:

FIG. 7

DATA CAPTURE DURING PRINT PROCESS

CROSS-REFERENCED APPLICATIONS

This non-provisional application is a continuation in part of the non-provisional patent application Ser. No. 10/172,154 with inventors Kofman et al., entitled "PRINTING IN A SECURE ENVIRONMENT" filed Jun. 14, 2002, now U.S. Pat. No. 7,196,808, which is hereby incorporated by reference in its entirety. The aforementioned non-provisional application is a continuation in part of the non-provisional patent application Ser. No. 10/133,100 with inventors Kofman et al., entitled "MAPPING A PRINT STREAM FOR PRINTING ON MAILERS FROM A FIRST APPLICATION FOR INPUT TO A SECOND APPLICATION" filed Apr. 26, 2002, now U.S. Pat. No. 7,085,998, which is hereby incorporated by reference in its entirety. The aforementioned non-provisional application is based on the provisional patent application Ser. No. 60/367,118 with inventors Kofman et al., entitled "MAPPING A PRINTER STREAM FOR PRINTING ON POSTAL FORMS" filed Mar. 22, 2002, which is hereby incorporated by reference in its entirety.

The subject matter of the present application is related to the following commonly owned U.S. Patents: U.S. Pat. No. 5,865,717, filed Jun. 7, 1995, issued Feb. 2, 1999 to Fabel for a Mailing Form for Non-Impact Printing, U.S. Pat. No. 6,095,919, filed Oct. 27, 1998, issued Aug. 1, 2000 to Fabel for an Extendible Form for Non-impact Printer and U.S. Pat. No. 6,173,888, filed Feb. 2, 1999, issued Jan. 16, 2001 to Fabel for a Mailing Form for Non-impact Printing. The subject matter of the present application is related to the following commonly owned U.S. Application: U.S. application Ser. No. 09/557,492, filed Apr. 24, 2000, to Fabel for a Mailing Form for Non-impact Printing. The U.S. Application and each of the U.S. Patents described above are hereby incorporated by reference in their entirety.

PARTIAL WAIVER OF COPYRIGHT

All of the material in this patent application is subject to copyright protection under the copyright laws of the United States and of other countries. As of the first effective filing date of the present application, this material is protected as unpublished material. However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

BACKGROUND OF THE INVENTION

1. Field of the Invention

This invention generally relates to the field of automating business forms and mailers and more specifically to automating business forms and mailers by mapping print stream data from a first application and for input to a second application 2. Description of Related Art As technology progresses, the business office is becoming more and more automated. Faxes, file servers, email, teleconferencing and cell phones have revolutionized the way firms do business. Mailers, in particular, have enjoyed increasing popularity. A mailer is a consumable paper product that allows for quick and easy printing and mailing of information. A mailer can include an envelope, an insert and a return envelope, which may be created by folding the original document. For example, mailers are used to send account statements, invoices, checks, and tax forms to customers and employees of a business. The commonly owned U.S. Patents and U.S. Application described above provide more information on mailers. A mailer allows a firm or small business to print directly onto one product all of the information necessary for mailing to a customer, client or employee. This is advantageous as it eliminates the separate printing of an envelope, an insert and a return envelope, as well as the need for the insertion of the return envelope and the insert into the envelope. Mailers, however, do not come without their drawbacks.

One problem with the use of a mailer is producing the mailer. Mailers often require folding and sealing before sending out. Current folding/sealing machines are bulky and costly. Thus, businesses are forced to buy additional hardware, apart from software and printers, in order to produce a mailer. This is cost prohibitive for medium and small businesses. Therefore, a need exists to provide a cost effective method of producing mailers for medium and small businesses.

One problem with the production of business forms, such as mailers, is the compatibility of business forms with the applications providing the information. Currently, various applications providing information, such as QuickBooks, support only certain business forms that are provided by the same entity that provides the application. This is disadvantageous as it limits the range of business forms available to the users that are utilizing the application of the providing entity. It would be advantageous to allow additional firms to provide business forms on which to print the information that is provided by these entities. Therefore, a need exists for a method for printing information from various applications onto various business forms provided by separate entities.

Yet another problem with the production of business forms is that current business form printing software often does not allow for the extraction of information from multiple source documents or the placement of extracted information into multiple business forms. Typically, information is garnered from a source document and printed onto a business form or mailer. However, users of business form printing software sometimes desire to garner information from more than one source document. In addition, users sometimes desire to print garnered information into alternate business form(s). Therefore, a need exists for a system that supports the garnering of information from multiple source documents and the placement of garnered information into multiple business forms.

Yet another problem with the production of business forms is that current business form printing software does not allow for the printing of customized information onto the business form. Users of business form printing software often desire to print customized information, such as logos or signatures, onto business forms. It would be advantageous to allow the printing of such information as it would increase the customizability of the business form printing software and further automate the printing of information onto business form. Therefore, a need exists for a system that allows for the printing of customized information onto a business forms.

Yet another problem with the production of business forms is that current business form printing software requires duplex or multiple pass printers. This is disadvantageous and the current installed base of printers substantially comprises simplex or single pass printers. It would be advantageous for business form printing software to support the current installed base of single printers as it is cost effective for those users to continue using their current printers, as opposed to purchasing new printers. Therefore, a need exists for a business form printing system that supports simplex or single pass printers.

Yet another problem with the production of business forms is that current business form printing software often does not allow for importing or exporting from or to other software packages or operating systems. Users of business form printing software sometimes desire to garner information from more than one document over more than one application or over more than one operating system. In addition, users of business form printing software sometimes desire to print information onto more than one business form over more than one application or over more than one operating system. Therefore, a need exists for a system that imports multiple source documents over multiple applications and operating systems and that exports information into multiple business forms over multiple applications and operating systems.

Yet another problem with the production of business forms is that business form printing software often does not allow for the application of PC postage. Typically, PC postage is printed onto a predefined location on a business form or mailer. In addition, the PC postage aspect of a business form or mailer is protected by security measures limiting a user's access to the PC postage information. This is disadvantageous as it limits the customizability of the formatting of information on the business form or mailer. Therefore, a need exists for a system that allows for the relocation and rearrangement of PC postage while complying with security measures protecting PC postage.

Another problem with multi-user computer systems, such as a fully-staffed business office, is variable security. Multi-user computer systems often include individual user account permissions such that different users can have different permissions to execute certain actions. For example, an administrator can have full permissions to read and write to any file and access any device. A guest user, however, will only have permissions to read and write certain files and to access only certain devices. This can pose an obstacle in certain situations. For example, an executable that is initiated by a dynamically linked library (DLL) or by another executable may inherit permissions of a user account different from the user account pertaining to the initiating entity. If the permissions of the inherited user account hold permissions different than the current user account, the current user can experience a problem when he attempts to read or write certain files where the permissions differ. This is disadvantageous as it confuses the user and consumes his time in rectifying the problem. Therefore, a need exists for a system that allows for the easy inheritance of permissions of the current user by child applications Yet another problem with multi-user computer systems is enforcement of variable security. Multi-user computer systems that include individual user account permissions must enforce individual permissions on each user. Typically, this is accomplished by matching the user account permissions with the permissions defined on an individual file. When a file is created with incorrect permissions, the intended permissions can no longer be enforced. This is disadvantageous as it inhibits the enforcement of security. Therefore, a need exists to enforce security on individual files without using defined file permissions.

Therefore, a need exists to overcome the problems with the prior art as discussed above.

SUMMARY OF THE INVENTION

Briefly, in accordance with the present invention, disclosed is a system, method and computer readable medium for mapping print stream data for printing on business forms or mailers. In an embodiment of the present invention, the method on a computer system includes the definition of a source template and a target, or destination, template. A source template defines the zones of a source document and the content in each zone. A source document is a document comprising a statement of account, an account report or an invoice. A target template defines the zones of a target document and the content that shall be placed in each zone. A target document is the document that is printed onto a business form or mailer. The mapping operation begins with the reception of print stream data. Using the source template, the print stream data is parsed and content is extracted. Then, the extracted content is placed in pre-defined zones in the target template to produce a target document. The target document is then printed onto a business form or mailer.

The described embodiments of the present invention are advantageous as they allow for the automation of printing of business forms or mailers. Target documents are printed using the print stream data of a source document. This allows for the quick and easy printing of a business form or mailer. Another advantage of the present invention is that the method of the present invention is transparent to the user. Because the user simply prints a source document to produce a printed business form or mailer, little or no interaction is needed with the proposed system. This results in increased usability. Yet another advantage of the present invention is the mapping of information between incompatible applications. This is beneficial as it facilitates the use of information across different applications and formats.

Also, in accordance with the present invention, disclosed is a system, method and computer readable medium for capturing data during a print process. In an embodiment of the present invention, the method on a computer system includes observing a print command issued by an application. Next, a spool file in a condensed format is written to a disk in response to the print command. This spool file read, and subsequently an output file is generated based on information in the spool file. Then, the output file is modified to conform to a template. Lastly, the output file that was modified is sent to an output destination, such as a printer.

The described embodiments of the present invention are advantageous as they allow for capturing of data during the print process before the final print data stream is created. The desired data is garnered from a temporary spool file instead of a final print data stream. This is beneficial as data is often lost during conversion of a spool file to a print data stream. This results in the capture of more accurate and precise information. Another advantage of the present invention is that data is garnered from a spool file (written in EMF format) instead of a print data stream, for which Optical Character Recognition must be used. Reading an EMF file requires much less processing resources than the use of Optical Character Recognition to read a print data stream. This results in a reduction in processing requirements and greater efficiency. Yet another advantage of the present invention is the use of an EMF file containing the desired information for capture. The nature of an EMF file allows for the quick and easy sending and receiving of the file over a network. This is beneficial as it allows the desired information to be distributed efficiently.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings. Additionally, the left-most digit of a reference number identifies the drawing in which the reference number first appears.

FIG. 4 is a representation of a source document, of FIG. 3 of the present invention.

FIG. 7 is a representation of a target document of FIG. 6, in one embodiment of the present invention.

DETAILED DESCRIPTION OF THE PREFERRED EMBODIMENTS

I. Overview

Figure 1:
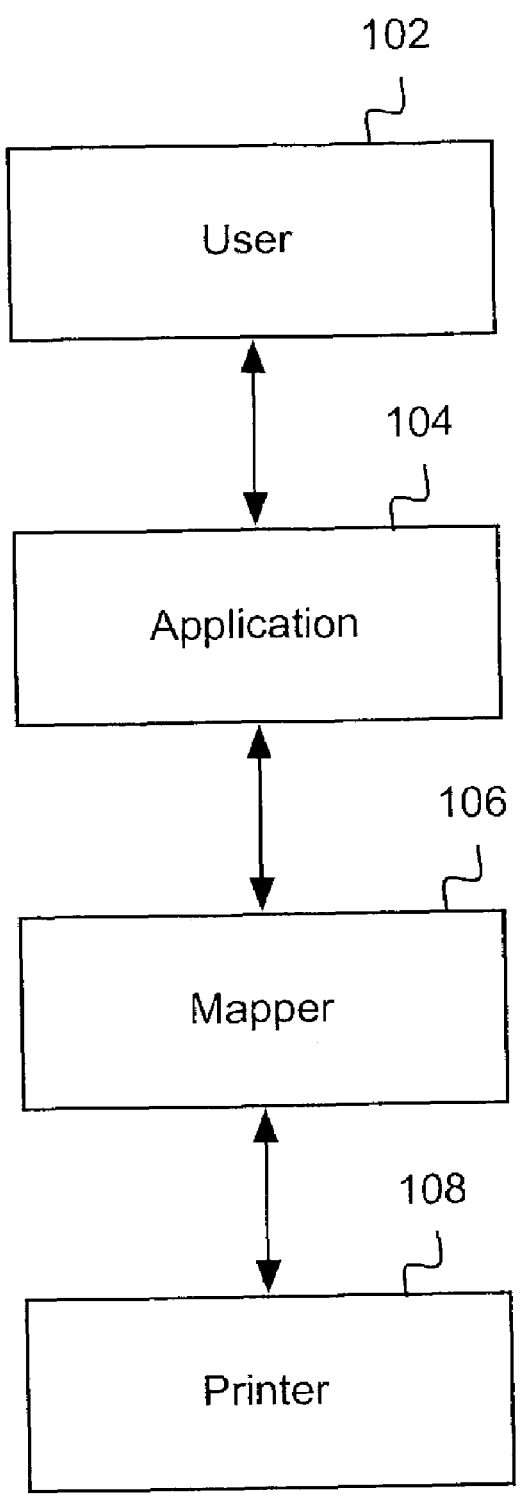
FIG. 1 is a block diagram illustrating the overall system architecture of one embodiment of the present invention.

FIG. 1 is a block diagram illustrating the overall system architecture of one embodiment of the present invention. A user 102 utilizes a client computer system to execute an application 104. A mapper 106 performs the mapping operation of the present invention, i.e., capturing the print stream and mapping to a business form or mailer, and prints to a printer 108. In an embodiment of the present invention, application 104 and mapper 106 execute on the same client computer system. In another embodiment of the present invention, application 104 and mapper 106 execute on separate computer systems that are connected via a network. An example network is described below.

The application 104 is a financial software application such as QuickBooks or Peachtree. In another embodiment of the present invention, application 104 is any application that routinely sends information to a printer 108, such as a word processor, a spreadsheet program, a presentation program or a graphic art design application.

The computer systems on which application 104 and mapper 106 execute comprise one or more Personal Computers (PCs) (e.g., IBM or compatible PC workstations running the Microsoft Windows 95/98/2000/ME/CE/NT/XP operating system, Macintosh computers running the Mac OS operating system, or equivalent), Personal Digital Assistants (PDAs), game consoles or any other computer processing devices. In another embodiment of the present invention, the computer systems on which application 104 and mapper 106 execute are one or more server systems (e.g., SUN Ultra workstations running the SunOS or AIX operating system or IBM RS/6000 workstations and servers running the AIX operating system). The printer 108 is a commercially available printer, such as a non-impact printer, a laser printer, an inkjet printer, a bubblejet printer, a dot matrix printer, a thermal printer, or the like.

In an alternate embodiment of the present invention, FIG. 1 includes a network for connecting application 104, mapper 106 and printer 108. The network is a circuit switched network, such as the Public Service Telephone Network (PSTN). In another embodiment of the present invention, the network is a packet switched network. The packet switched network is a wide area network (WAN), such as the global Internet, a private WAN, a local area network (LAN), a telecommunications network or any combination of the above-mentioned networks. The network is a wired network, a wireless network, a broadcast network or a point-to-point network.

II. The Print Processing Operation

Figure 2:
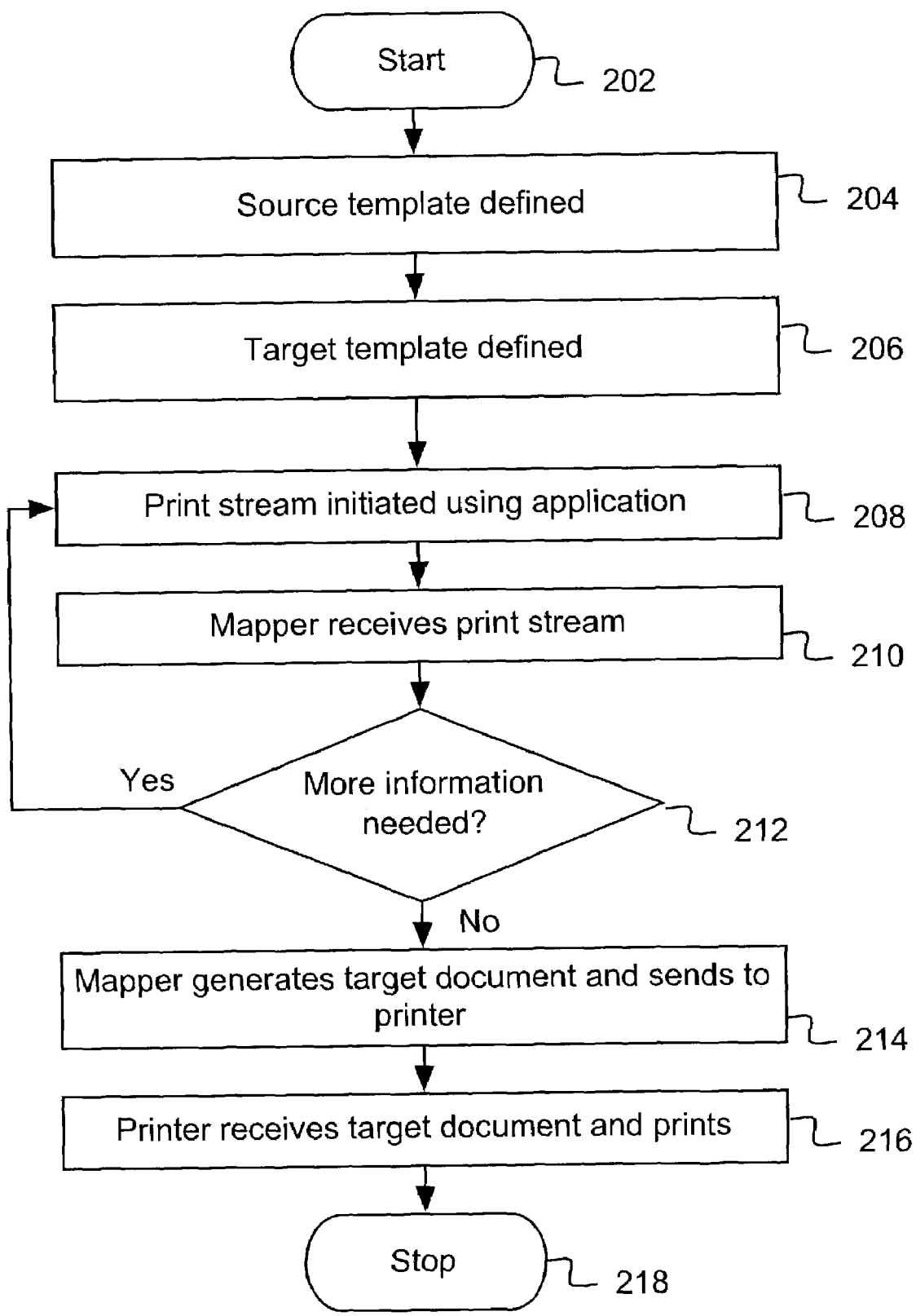
FIG. 2 is a flowchart depicting the operation and control flow of the overall process of FIG. 1 of the present invention.

FIG. 2 is a flowchart depicting the operation and control flow of the overall process of FIG. 1 of the present invention.

The control flow of FIG. 2 begins with step 202 and flows directly to step 204. In step 204, a source template is defined. A source template is a file that defines the zones and content of a source document. Source templates and source documents are described in greater detail below (see FIG. 3 and FIG. 4). In one alternative, the user 102 defines the source template using an application, such as one described below in greater detail (see FIG. 5). In another alternative, the source template is defined by another entity, such as a service provider, separate from user 102. In this alternative, the service provider can be the same entity as the entity which provided the system of the present invention.

In step 206, a target, or destination template, is defined. A target template is a file that defines the zones and content of a target document. Target templates are described in greater detail below (see FIG. 6 and FIG. 7). In one alternative, the user 102 defines the target template using an application, such as one described below in greater detail (see FIG. 8). In another alternative, the target template is defined by another entity, such as a service provider, separate from user 102. In this alternative, the service provider can be the same entity as the entity which provided the system of the present invention.

In an optional step after step 206, the user 102 defines set-up information. In this step, the user 102 defines information that is used in the printing process, described in greater detail below. Set-up information can include static information that is printed onto the business form or mailer. Static information is defined as information that is printed on a business form or mailer and that does not change over a set of business forms or mailers. Dynamic information, on the other hand, is defined as information that is printed on a business form or mailer and that may change over a set of business forms or mailers. For example, if a user 102 prints a set of mailers including a check to a customer, the static information includes such information as the return address on the mailer, the bank information on the check and the postage on the mailer. The dynamic information includes such information as the address on the mailer, the recipient's name and the amount of the check. Other examples of set-up information that may be specified by a user 102 in this optional step includes one or more of the following:

Company logos
PC postage conforming to the Information Based Indicium Program (IBIP) standard
Bar codes used to identify other information in the mailer, such as an account number, a check number or an invoice number
Signatures printed on a letter or on a check
Bank information conforming to the Magnetic Ink Character Recognition (MICR) standard and using a standard font, such as E13B MICR font, including:
Bank routing number
Bank account number
Check number
Account name
Account address In an embodiment of the present invention, security measures are taken during the input and modification of set-up information in this optional step. In this embodiment, a user is authenticated, such as via a login name and password, before he is able to input or modify set-up information. This allows sensitive information, such as one or more signatures printed on a check, to be protected from unauthorized access by a user.

In step 208, a print stream including a source document is initiated using application 104. Source documents are described in greater detail below. In one embodiment of the present invention, the user 102 issues a print command via application 104. In step 210, the mapper 106 receives the source document in the print stream data. It should be noted that in this document, the terms "file" and "document" are used interchangeably. Both terms are used to refer to a single sequence of bytes of finite length stored in a non-volatile storage medium.

In step 212, the mapper 106 determines whether the target document to be printed requires information that is not present in the source document. If the result of this determination is positive, control flows back to step 208. If the result of this determination of is negative, control flows to step 214. If the result of the determination of step 212 is positive, in one embodiment of the present invention, mapper 106 determines that mapper 106 must receive additional information in order to complete the target document to be printed. Subsequently, mapper 106 acquires the required information by searching for and reading a document or documents that hold the required information. Alternatively, mapper 106 communicates to application 104 the information it requires and application 104 provides the required information to mapper 106 in step 208. This may be, for example, printing one type of output from an application 104 such as an invoice followed by a second type of action such as printing a check. The mapper 106 assembles the information needed from the one or more output print jobs from the application 104.

In another embodiment of the present invention, if the result of the determination of step 212 is positive, mapper 106 communicates to the user 102 that mapper 106 must receive additional information in order to complete the target document to be printed. The user 102 subsequently provides the additional information to the mapper 106 by printing in step 208 an additional source document, which includes the information the mapper 106 requires to complete the target document to be printed. In this embodiment of the present invention, the mapper 106 provides to the user 102 a pop-up window indicating the additional information necessary to complete the target document to be printed.

In step 214, the mapper 106 generates the target document to be printed, and sends the target document to printer 108. This operation is described in greater detail below. In step 216, the printer 108 receives the target document from mapper 106 and proceeds to print the target document. In step 216, the target document is printed onto a business form or mailer. In step 218, the control flow of FIG. 2 ceases.

III. The Source Template

Figure 3:
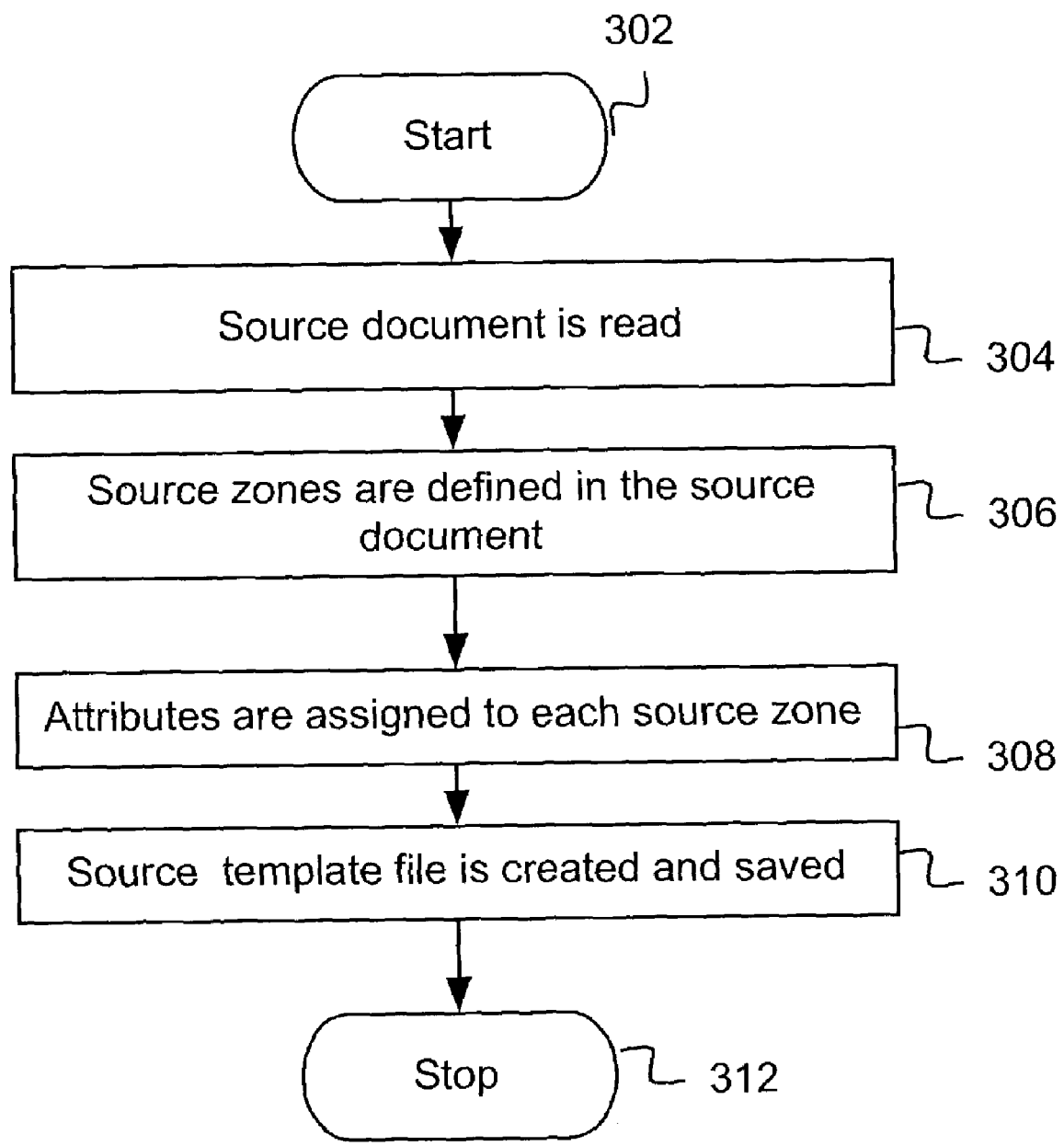
FIG. 3 is a flowchart depicting the operation and control flow of the source template generation process of FIG. 2 according to the present invention.

FIG. 3 is a flowchart depicting the operation and control flow of the source template generation process of FIG. 2, according to the present invention. FIG. 3 describes in more detail the step 204 of FIG. 2. The control flow of FIG. 3 begins with step 302 and flows directly to step 304. In step 304, a source document is read by an application program used for generating a source template. Such an application is described in greater detail below in FIG. 5. It should be noted that the present invention supports various types of source documents. Typically, the source document is a document including information that is directed to clients, customers or employees of a business. In addition, the source document is generated by an application 104. As explained above, application 104 is, for example, a financial software application such as QuickBooks or Peachtree or any other software application containing financial or account information. Thus, in this example, the source document is an invoice, a client account statement, a billing statement, an account report, a check or the like.

In step 306, source zones are defined in the source document. A source zone is an area of a source document that provides content information that may be placed in a target document. The content information in a source zone is considered dynamic content information. Several types of source zones are defined, wherein each type of source zone contains a certain type of content information. The following are examples of source zone types:

Key Zone: Contains keywords associated with the source document
    Text Zone: Contains text
    Picture Zone: Contains an image
    Table Zone: Contains a table or other tabular data
    Address Zone: Contains a mailing address In step 308, attributes are assigned to each source zone. Examples of attributes that may be assigned to a source zone are the name of a source zone, the location of a source zone (expressed in pixel coordinates) and the format of the content information in the source zone.

In step 310, a source template file is generated and saved. The source template file contains, at a minimum, a list containing each source zone and the pixel coordinates defining the location of each source zone in the source document. The source template file is a text file, an HTML file, an SGML file, an XML file, or any other file format conducive to holding a hierarchical structured data set. An example of a source template file written in text format, is shown below:

[Zones]
    key1=key,5.991,0.719,1.011,0.146!
    address=text,0.865,0.146,2.563,1.323!
    bill to=text,0.542,1.833,3.365,1.198!
    date=text,6.002,0.938,0.844,0.198!
    invoice=text,7.116,0.917,0.761,0.208!
    terms=text,5.117,3.683,1.2,0.317!
    project=text,6.418,3.646,1.532,0.365!
    total=text,6.95,9.51,1.011,0.354!
    note=text,0.05,9.482,5.408,0.425!
    description=text,1.032,4.396,4.428,0.604!
    quantity=text,0.479,4.406,0.479,0.604!
    rate=text,6.418,4.396,0.26,0.604!
    amount=text,7.429,4.406,0.448,0.625!
    pono=text,3.959,3.656,1,0.354!
    key_invoice=key,6.845,0.177,1.115,0.292!
    key_quantity=key,0.042,4.125,0.875,0.198!

In step 312, the control flow of FIG. 3 ceases.

FIG. 4 is a representation of a source document, of FIG. 3 of the present invention. As described above, a source document is any document that is printed from application 104. Specifically, a source document is a document that contains financial or account information that the user 102 desires to access. In FIG. 4, the source document is an invoice that is printed from a financial management software application, such as QuickBooks. The source document of FIG. 4 shows a title for the document at 401—an invoice. FIG. 4 further shows a client address 402 and an invoice number 410. The invoice of FIG. 4 also shows a transaction description column 404, which provides information on a transaction for which the customer is being charged, and an amount column 406, which defines the amount the customer is being charged for each transaction. Lastly, the invoice of FIG. 4 shows a total price 408, which defines the total amount the customer is being charged.

Figure 5:
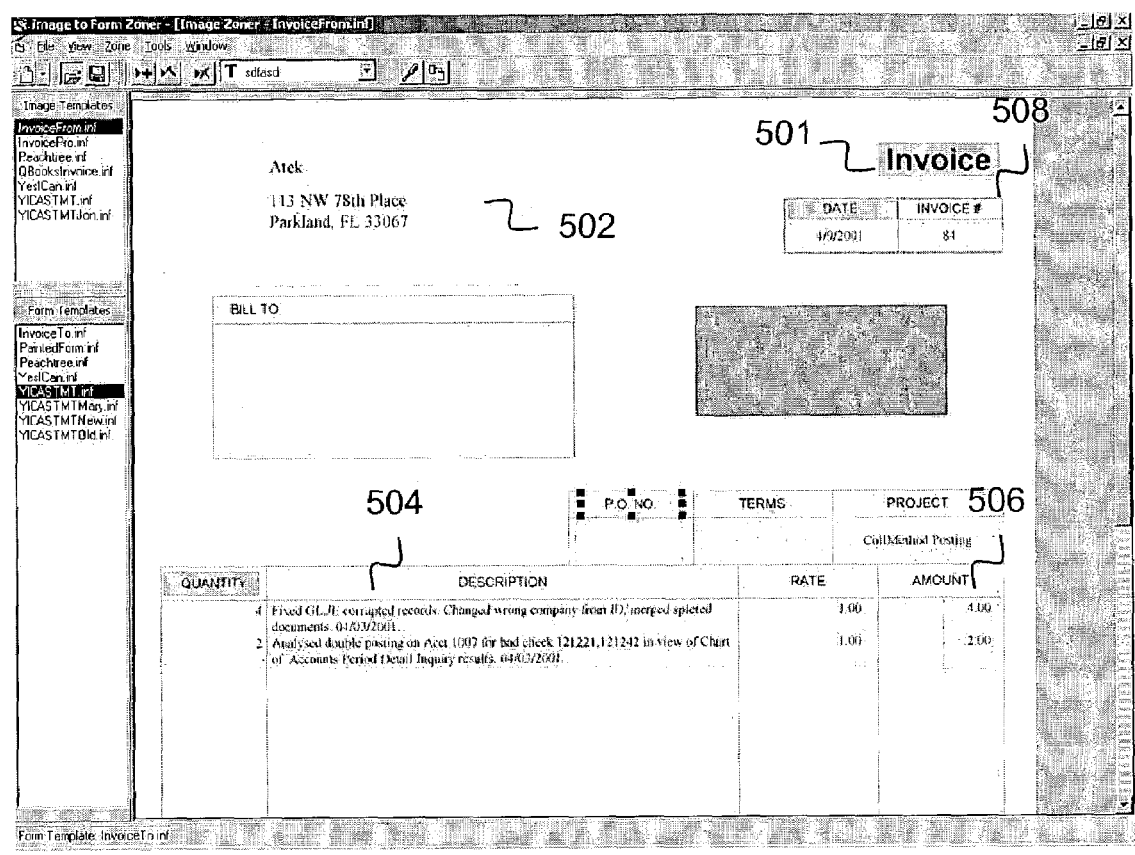
FIG. 5 is a screenshot of one embodiment of a GUI of an application of FIG. 3 used for generating a source template, according to the present invention.

FIG. 5 is a screenshot of one embodiment of a Graphical User Interface (GUI) of an application of FIG. 3 used for generating a source template. The GUI of FIG. 5 is used for performing the steps 306 and 308 of FIG. 3. The GUI shows that the invoice of FIG. 4, the source document, is graphically displayed in the window of FIG. 5. A user or programmer utilizing the GUI of FIG. 5 proceeds to select areas of the invoice using a highlighted box and then specify the type of source zone that is associated with that area. Based on the type of source zone selected for each area, the mapper 106 processes the data in each source zone in a particular way. This is described in greater detail below.

FIG. 5 shows that the user or programmer has created a highlighted box 501 over title 401. Box 501 is defined by the user or programmer as a Key Zone 502 because the title 401 contains a keyword associated with the source document. In addition, a highlighted box 502 is created over client address 402. Box 502 is defined as an Address Zone because it clearly contains an address. A highlighted box 504 has been created over transaction description column 404. Box 504 is defined as a Table Zone because box 504 contains a table of information regarding transactions. A highlighted box 506 is created over amount column 406. Box 506 is defined as a Table Zone because box 506 contains a table of information regarding the amount charged for each particular item. Lastly, a highlighted box 508 has been created over invoice number 410. Box 508 is defined as a Text Zone because box 508 contains text pertaining to the invoice number of the source document.

As explained above for step 310 of FIG. 3, once the source document is fully defined using the highlighted boxes, a source template file is generated. An example of a source template file, in text format, is shown above.

IV. The Target Template

Figure 6:
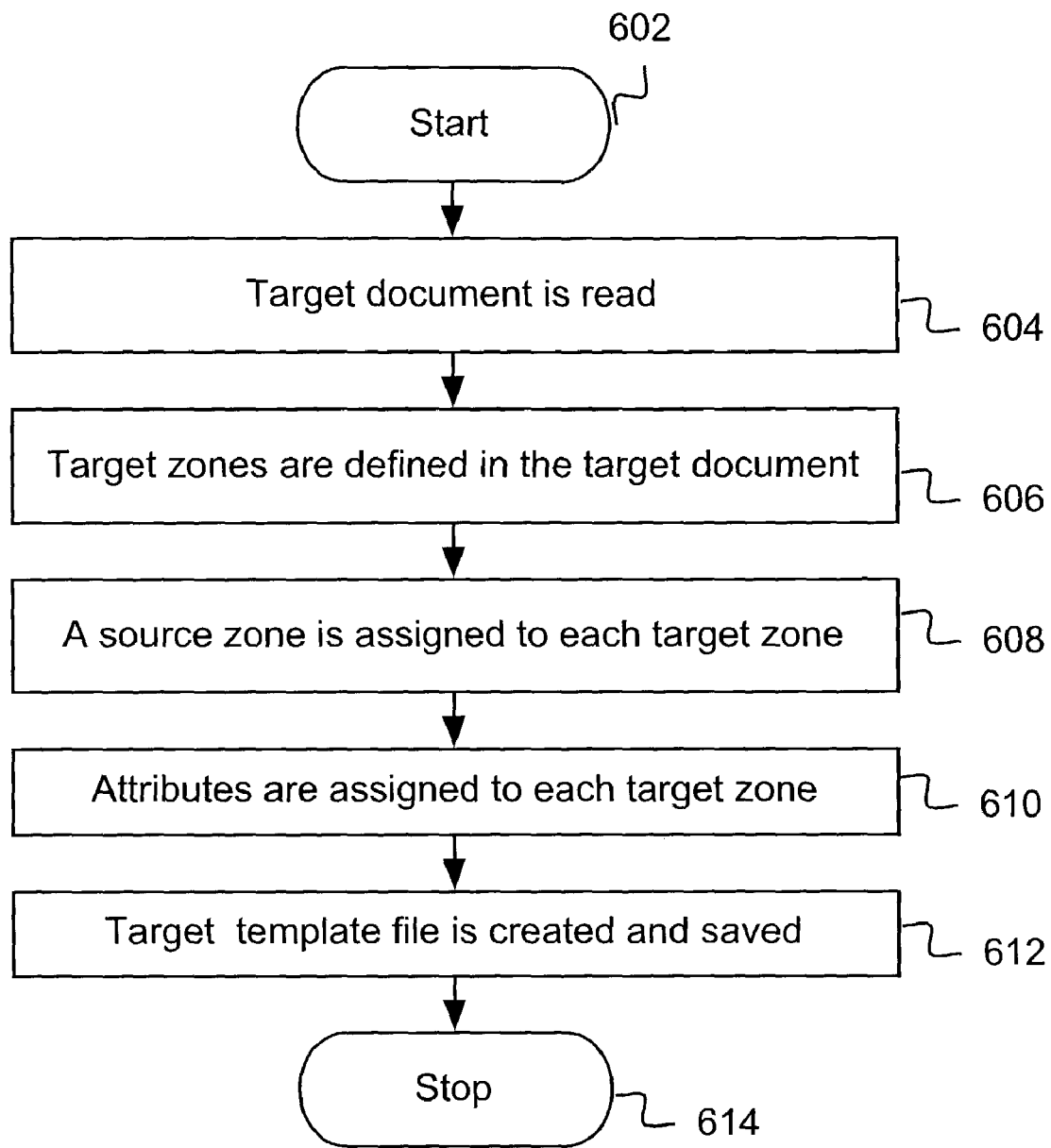
FIG. 6 is a flowchart depicting the operation and control flow of the target template generation process of one embodiment of the present invention.

FIG. 6 is a flowchart depicting the operation and control flow of the target template generation process of one embodiment of the present invention. FIG. 6 describes in more detail the step 206 of FIG. 2. The control flow of FIG. 6 begins with step 602 and flows directly to step 604. In step 604, a target document is read by an application program used for generating a target template. Such an application is described in greater detail below in FIG. 8. It should be noted that the present invention supports various types of target documents. Typically, the target document is a document containing the information from a source document and which is printed onto a business form or mailer. As explained above, the source document is an invoice, a client account statement, a billing statement, a report or the like. Thus, the target document must contain any such information. In an embodiment, the source document is an invoice, a client account statement, a billing statement, an account report, a check, a tax form (such as a 1099 Div or a 1099 R), a Customs Declaration postal form or the like. An example target document is shown below in FIG. 7.

In step 606, target zones are defined in the target document. A target zone is an area of a target document in which content information from the source document is placed. Several types of target zones are defined, wherein each type of target zone contains a certain type of content information. The following are examples of target zone types:

Key Zone: Contains keywords associated with the source document
    Text Zone: Contains text
    Picture Zone: Contains an image
    Table Zone: Contains a table or other tabular data
    Address Zone: Contains a mailing address Locked Zone: A zone on the target document that is locked and may not be overwritten with any data Postage Zone: Contains PC postage In step 608, a source zone is assigned to each target zone. In this step, the source content for each target zone is defined. As explained above, a target zone defines an area in which content from a source document is placed. Thus, in this step, the content from a source document, defined as a source zone, is linked to each target zone. This is explained in greater detail below.

In step 610, attributes are assigned to each target zone. The following attributes are supported for each target zone:

Parameters: Pixel coordinates defining the location of the target zone

Alignment: The horizontal or vertical alignment of the content in the target zone Font: The font of any text that will be entered into the target zone Expand/Crop Image: If the target zone is an Image Zone, this describes how to expand or crop the image Image rotation: If the zone is an Image Zone, this describes how to rotate the image In step 612, a target template file is generated and saved. The target template file contains, at a minimum, a list containing each target zone, the pixel coordinates defining the location of each target zone in the target document and the source zone corresponding to each target zone. The target template file is a text file, an HTML file, an SGML file, an XML file, or any other file format conducive to holding a hierarchical structured data set. An example of a target template file written in text format, is shown below:

[Lock]
[Zones]
address=4.506,1.972,3.494,1.826,Crop,180,Right,Bottom,,,0,Times New Roman!10!
date=0.73,5.54,1.46,0.209,Crop,0,Center,Top,,,,Times New Roman!10!;5.737,6.78,0.855,0.156,Crop,0,Left,Top,,,0,Times New Roman!8!
invoice=0.73,5.874,1.471,0.198,Crop,0,Center,Top,,,, Times New Roman!10!;5.747,6.927,0.855,0.146,Crop, 0,Left,Top,,,,Times New Roman!8!
description=0.428,4.382,3.588,0.855,Crop,0,Left,Top,,,0, Times New Roman!7!;3.035,7.355,2.91,1.002,Crop,0, Left,Top,,,,Times New Roman!8!
amount=4.057,4.382,0.741,0.876,Crop,0,Right,Top,,,0, Courier New!7!;7.28,7.355,0.793,1.002,Crop,0,Right, Top,,,0,Courier New!8!
quantity=1.773,7.355,0.615,1.002,Crop,0,Center,Top,,,0, Courier New!8!;2.42,7.355,0.584,1.002,Crop,0,Center, Top,,,0,Courier New!8!
bill to=1.439,0.115,3.87,1.596,Crop,180,Right,Bottom,,, 0,Times New Roman!10!;2.545,5.613,2.274,0.824, Crop,0,Left,Top,,,,Times New Roman!9!;0.407,8.67, 4.819,2.045,Crop,0,Left,Top,,,0,Times New Roman!10!
total=4.057,5.268,0.741,0.136,Crop,0,Right,Top,,,0,Courier New!7!B;7.468,9.097,0.605,0.167,Crop,0,Right, Top,,,0,Times New Roman!7!
pono=7.468,6.906,1.001,0.219,Crop,0,Left,Top,,,,Times New Roman!8!
rate=5.956,7.355,0.772,1.002,Crop,0,Right,Top,,,0,Courier New!8!

In step 614, the control flow of FIG. 6 ceases.

FIG. 7 is a representation of a target document of FIG. 6, in one embodiment of the present invention. As described above, a target document is a business form or mailer such as those described by the section entitled Cross Referenced Applications and each incorporated herein in their entirety. The mailer of FIG. 7 is a client account statement form that is used to provide a client, or customer with information regarding activity on the client's account. An invoice, such as the invoice of FIG. 4, can generate activity that is described in the client account statement of FIG. 7.

Note that the mailer of FIG. 7 already includes information including a return address and other text that indicates the type of information in the various tables. In an embodiment of the present invention, the information present in the mailer of FIG. 7 is static information that is specified by the user 102 in an optional step after step 206 of FIG. 2. This is described in greater detail above. In one alternative, the static information is pre-printed onto the mailer before the process of FIG. 2 is executed. This is advantageous in instances where the user 102 does not have the ability to print certain articles, such as magnetic ink or color logos. In another alternative, the static information is printed onto the mailer at the time that the dynamic information is printed onto the mailer in step 216 of FIG. 2.

In any case, the empty areas of the mailer of FIG. 7 will be populated with dynamic information—that is, the content extracted by the source document—in step 214 of FIG. 2. This process is described in greater detail below.

The target document of FIG. 7 shows a customer identification area 702 for identifying the party receiving the mailer. FIG. 7 also shows an invoice number column 704 for indicating the invoice number for each item purchased and an item amount column 706 for indicating the cost of each item purchased. Column 704 corresponds to column 710 and column 706 corresponds to column 712 as the client account statement duplicates this information in the target document. The total amount 708 indicates the combined cost of all items purchased. Cell 708 corresponds to cell 714.

Figure 8:
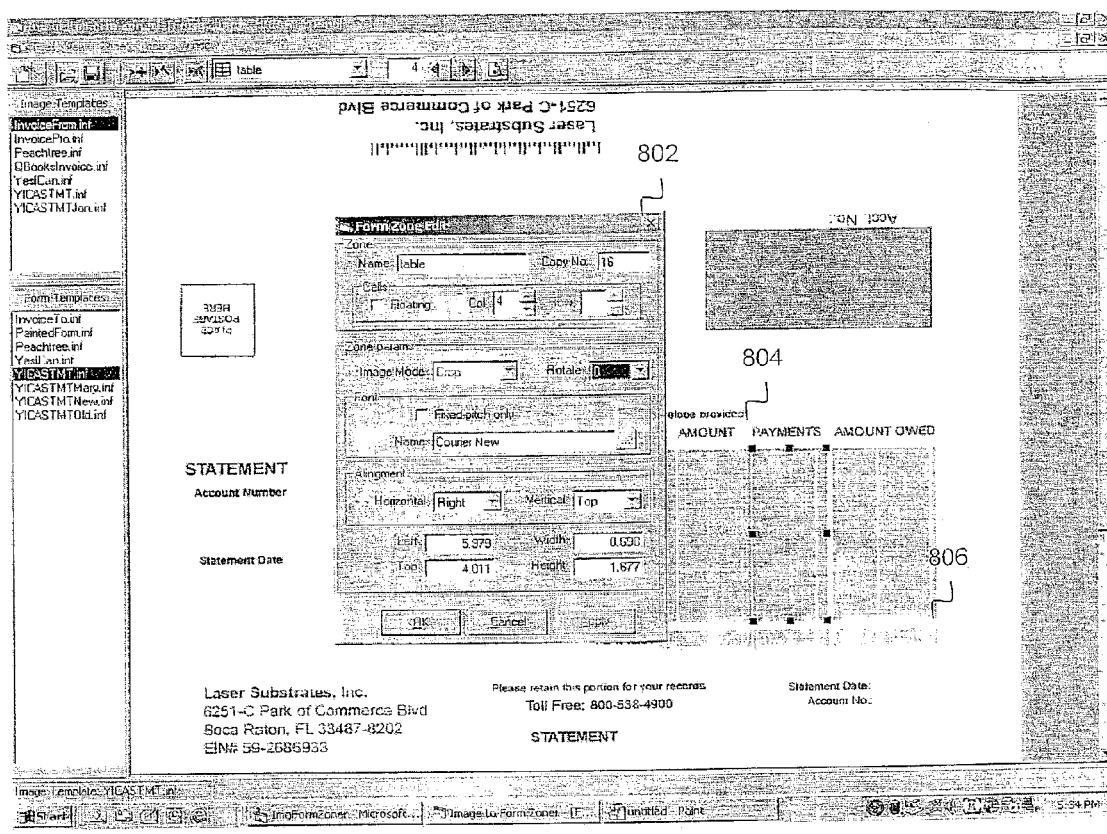
FIG. 8 is a screenshot of one embodiment of a GUI of an application used for generating a target template of FIG. 6, according to the present invention.

FIG. 8 is a screenshot of one embodiment of a GUI of an application used for generating a target template of FIG. 6, according to the present invention. The GUI of FIG. 8 is used for performing the steps 606-610 of FIG. 6. The GUI of FIG. 8 shows that the target document of FIG. 7 is graphically displayed in the window of FIG. 8. A user or programmer utilizing the GUI of FIG. 8 selects an area in the target document using a highlighted box and then specifies the type of target zone that is associated with that area. A list of target zones is given above. Further, the user or programmer also defines for each target zone the content that shall be entered into that area. That is, each target zone is assigned a source zone from which content is used to populate the target zone. The user accomplishes this by selecting for each target zone a source zone from a master list of source zones. The master list is created during the process of source template generation, such as described in FIG. 3. Based on the source zone selected for each target zone, the mapper 106 populates each target zone accordingly. This is described in greater detail below.

FIG. 8 illustrates that the user or programmer has created a highlighted box 804 over an item amount column (corresponding to column 706 of FIG. 7) for indicating the cost of each item purchased. Box 804 is defined by the user or programmer as a Table Zone because box 804 contains a table of information regarding item costs. A highlighted box 806 has been created over the total amount cell (corresponding to cell 708) for indicating the combined cost of all items purchased. Box 806 is defined as a Text Zone because box 806 contains simple text.

In an embodiment of the present invention, in addition to specifying the source zone associated with each target zone, the user or programmer can also specify attributes for each target zone. For example, using the pop-up GUI 802, the user or programmer can modify various attributes of each target zone. Popup GUI 802 shows that the following target zone attributes can be specified: the location of the target zone, the alignment of the text in the target zone, the font of the text in the target zone, the manner in which to expand or crop an image that shall be placed in the target Image Zone and the manner in which to rotate an image that shall be placed in the target Image Zone.

In an embodiment of the present invention, once the target document is fully defined using the highlighted boxes and pop-up GUI 802, a target template file is created. The target template file contains, at a minimum, a list of each target zone, the location of each target zone and the source zone associated with the target zone. An example of a target template file, in text format, is shown above.

V. The Mapper

Figure 9:
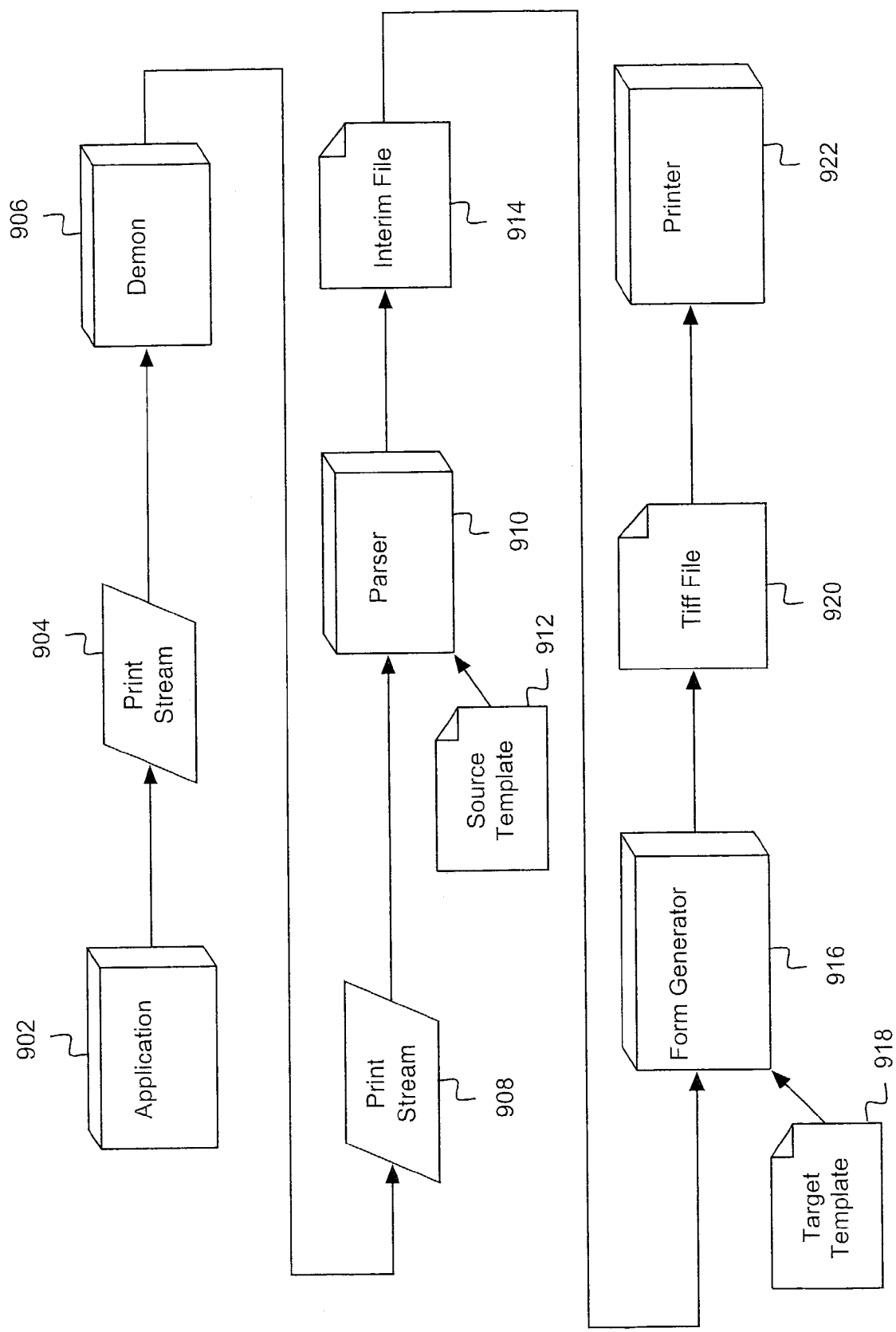
FIG. 9 is a functional diagram illustrating the mapping process of FIG. 1 according to one embodiment of the present invention.

FIG. 9 is a functional diagram illustrating the mapping process of FIG. 1 according to the present invention. FIG. 9 provides more detail of the process represented by step 214 of FIG. 2. FIG. 9 shows that an application 902, corresponding to application 104, has sent a print stream 904 containing a source document. The print stream 904 is subsequently captured by a demon 906. A demon 906 is an application program that resides on a client computer system for the purpose of performing a specified process at a predefined time or in response to a particular event. The demon, in one example, is a specialized printer driver. In this case, demon 906 receives the print stream 904, initiates the mapper 106 and redirects the print stream 904 as print stream 908 to the mapper 106. Mapper 106 is represented in FIG. 9 by functional block 910 representing the parser function and functional block 916 representing the form generating function. In an embodiment of the present invention, demon 906 is not present. In this embodiment, the print stream 904 is received directly by parser 910 from application 902.

The first operation performed by mapper 106 is the parsing of the print stream 908 by parser 910 using the source template 912, which was defined in the process of FIG. 3. In an embodiment of the present invention, parser 910 converts the format of the print stream 908 to a TIFF file format before parsing. In any event, the product of the operation of parser 910 is an interim file 914 containing the content that has been extracted from the print stream 908 in accordance with the source template 912. In an embodiment of the present invention, interim file 914 is a text file containing a list of source zones and the content contained in each source zone. In this embodiment, the interim file 914 is similar to the example source template file in text format shown above in the section entitled Source Template.

Form generator 916 receives interim file 914 and proceeds to populate the target template 918 using the content contained in interim file 914. The target template 918 defines the manner and format in which the content shall be entered into the specified target zones of the target template 918, as described in FIG. 6 above. The product of form generator 916 is a TIFF file 920. The TIFF file 920 is then sent to printer 922 for printing.

Figure 10A:
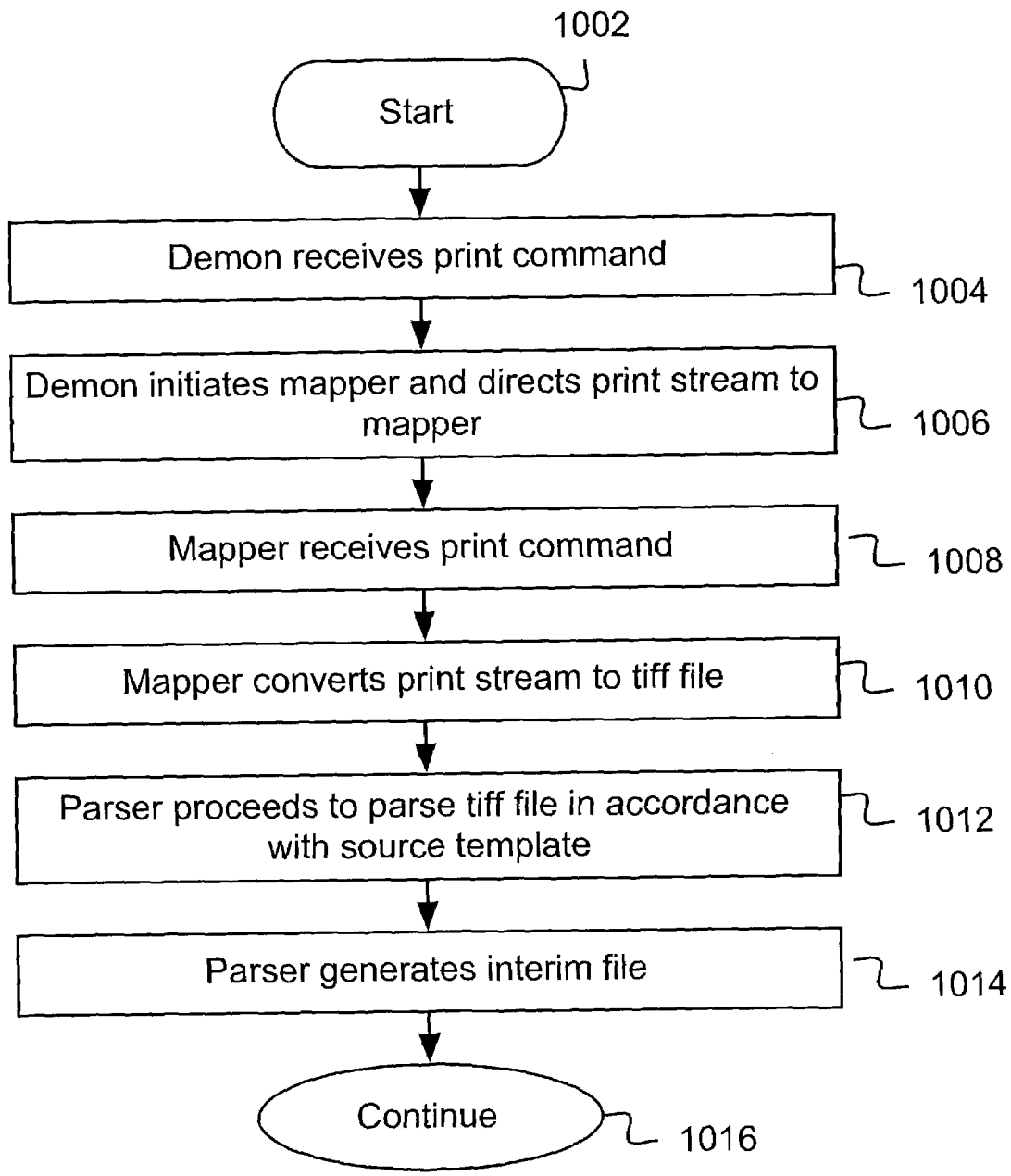
FIG. 10A is a flowchart depicting the operation and control flow of the mapping process of FIG, 8 according to the present invention.
Figure 10B:
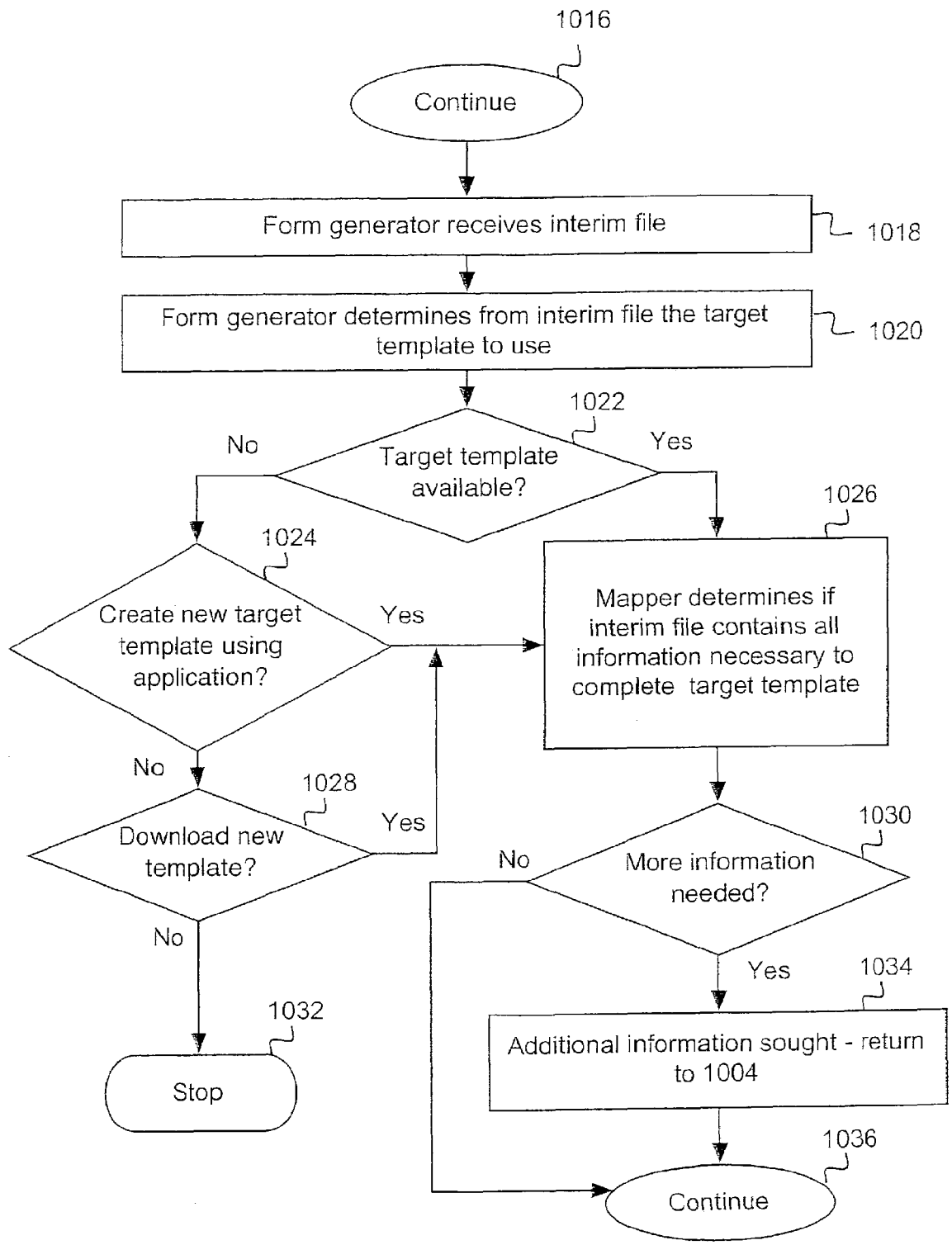
FIG. 10B is a continuation flowchart if FIG. 10A, in one embodiment of the present invention.
Figure 10C:
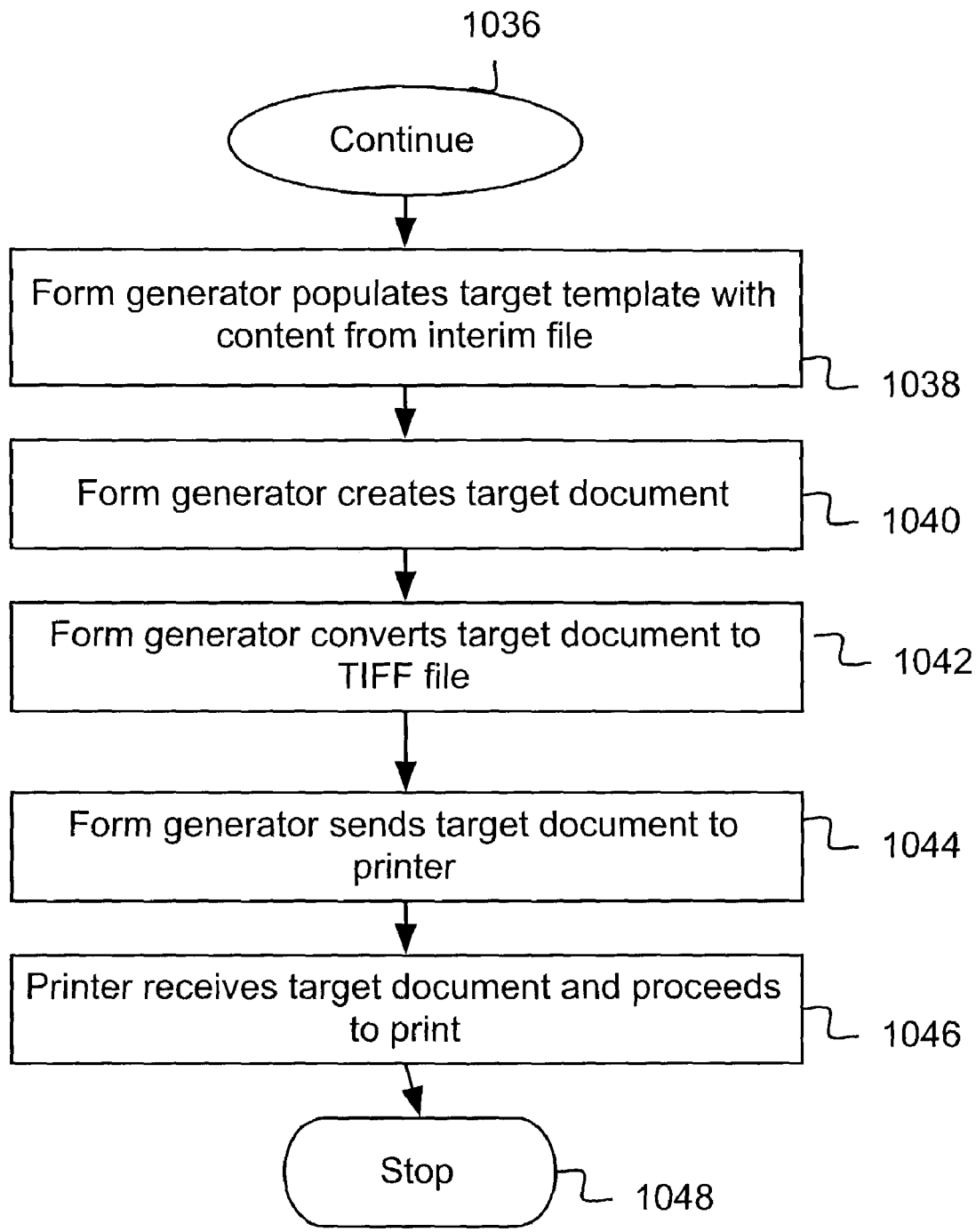
FIG. 10C is a continuation flowchart if FIG. 10B, in one embodiment of the present invention.

FIGS. 10A, 10B and 10C are flowcharts depicting the operation and control flow of the mapping process of one embodiment of the present invention. FIGS. 10A, 10B and 10C provide additional detail of the process represented by step 210 of FIG. 2. The control flow of FIGS. 10A, 10B and 10C begins with step 1002 and flows directly to step 1004. In step 1004, the demon 906 receives the print stream 904.

In step 1006, the demon 906 initiates the matter 106 and redirects the print stream 904, now print stream 908, to the mapper 106. In step 1008 the parser 910 of mapper 106 receives the print stream 908. In step 1010, in an embodiment of the present invention, parser 910 converts the format of the print stream 908 to a TIFF file format before parsing.

In step 1012, the parser 910 of mapper 106 parses the print stream 908 in accordance with a predefined source template 912. In this step, the parser 910 performs Optical Character Recognition (OCR) procedures on Text Zones of the source document as defined by the source template 912. In addition, the parser 910 generates image format copies for all other specified source zones of the source document as defined by the source template 912. In step 1014, the output of step 1012 is an interim file 914 that contains all content (image, text, etc.) extracted from the source document. Control flows from step 1014 to step 1016 and immediately continues with step 1018 of FIG. 10B.

In an embodiment of the present invention, the parser 910 of mapper 106, in step 1012, determines the source template 912 to use for each particular source document by performing OCR in Key Zones of the source document. The parser 910 subsequently attempts to match the text extracted from a Key Zone with text defined in source templates 912. Once a match is made, the corresponding source template 912 is used to parse the source document. This is useful when there are multiple source templates 912 defined for source documents.

In step 1018, the form generator 916 receives interim file 914. In step 1020, the form generator 916 determines from the interim file 914 the target template 918 to use in generating a target document. The form generator 916 makes this determination by reviewing the text found in a Key Zone or related source zone in the source document. The form generator 916 subsequently attempts to match the text extracted from a Key Zone in the source document with text defined in target templates 918. Once a match is made, the corresponding target template 918 is used to create the target document. This is useful when there are multiple target templates 918 defined for target documents.

In step 1022, the form generator 916 determines whether the appropriate target template 918 (chosen as the appropriate target template 918 in step 1020) is available. If the result of this determination is positive, the form generator 916 accesses the appropriate target template 918 and control flows to step 1026. If the result of this determination is negative, control flows to step 1024. In step 1024, the form generator 916 determines whether an appropriate target template 918 can be produced using an application, such as the target template generation application described in FIG. 8. If the result of the determination of step 1024 is positive, a user or a programmer uses an application such as described in FIG. 8 to produce the appropriate target template 918 and control flows to step 1026. If the result of the determination of step 1024 is negative, control flows to step 1028. In step 1028, the form generator 916 determines whether an appropriate target template 918 can be downloaded from a web site or other entity via a network. If the result of the determination of step 1028 is positive, the appropriate target template 918 is downloaded and control flows to step 1026. If the result of the determination of step 1028 is negative, control flows to step 1028.

In step 1026, the form generator 916 reviews the information interim file 914 and compares it to the information required to complete the target template 918. In step 1030, the form generator 916 determines whether the interim file 914 contains all of the information necessary to complete the target template 918. If the form generator 916 determines that more information is necessary, the form generator 916 seeks the required information and control flows to step 1034. If the form generator 916 determines that more information is not necessary, control flows to step 1036.

In an embodiment of the present invention, in step 1034, the mapper 106 automatically seeks the required information. Mapper 106 can accomplish this task by searching for a file or data set that contains the required information. Alternatively, the mapper 106 can communicate to application 104 the data that it requires and subsequently receive the required information from the application 104. In another embodiment, the mapper 106 can prompt the user 102 to provide the required information by providing another print stream that contains the required information. As explained above, the mapper 106 can communicate with the user 102 via a pop-up window that describes to the user 102 the required information. In step 1032, the control flow of FIG. 10 ceases. Control flows from step 1034 to step 1036 and immediately continues with step 1038 of FIG. 10C.

In step 1038, the form generator 916 of mapper 106 produces a target document by populating the target zones of target template 918 using the content in interim file 914, as specified by the target template 918. In an embodiment of the present invention, in step 1038, the form generator 916 also populates the target document with static content information specified by the user in an optional step after step 206 of FIG. 2. In step 1040, the form generator 916 generates the target document.

In step 1042, the form generator 916 converts the target document to a TIFF file 920. In an embodiment of the present invention, in step 1042, form generator 916 may also convert the target document into a printer format that is supported by printer 922. For example, the original print stream 904 may have been directed towards a particular type of printer, such as a non-impact printer, a laser printer, an inkjet printer, a bubblejet printer, a dot matrix printer, a thermal printer, or the like. In this case, the form generator 916 converts the target document into a printer format that is supported by printer 922. In step 1044, the form generator 916 sends the TIFF file 920 to the printer 922 for printing. In step 1046, the printer 922 receives the TIFF file 920 and proceeds to print the file. In step 1048, the control flow of FIG. 10 ceases.

VI. File Format Conversion

In an embodiment of the present invention, mapper 106 performs file format conversion between applications and/or operating systems having incompatible file format. In this embodiment, the mapper 106 captures a print stream containing a source document that was sent to a printer by a first application executing in a first operating system (OS). Subsequently, the mapper 106 proceeds to generate a target document in a file format that is supported by a second application executing in a second operating system. This is described in greater detail below.

This process is advantageous as it provides for increased compatibility between different applications and OS's. Unlike the previous embodiments, the output destination here is an application or OS. As an example of a situation wherein the aforementioned process is advantageous, consider a small business that utilizes a PC-based small business financial software application such as Quickbooks. As the small business grows into a middle sized business, the firm decides to utilize a Unix-based financial software application. As a result, the firm is faced with the problem of porting all of its' current PC-based Quickbooks files and databases to a Unix-based software application. Using the proposed invention, the business sends the PC-based QuickBooks files in a print stream to a converter module. The converter module then converts the information in the print stream into a format that is compatible with the Unix-based software application.

Figure 11:
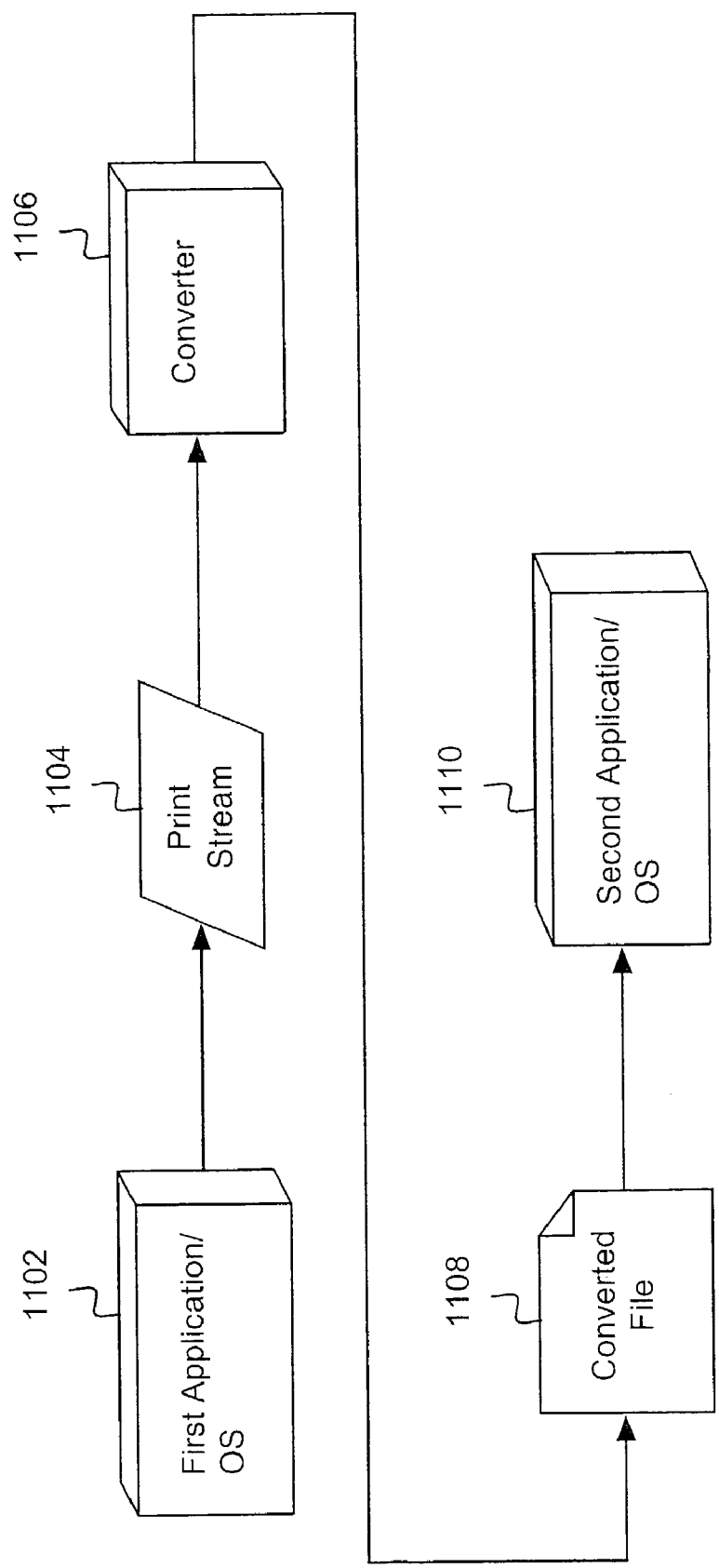
FIG. 11 is a functional diagram illustrating the file conversion process of another embodiment of the present invention.

FIG. 11 is a functional diagram illustrating the file conversion process of another embodiment of the present invention. FIG. 11 shows a first application executing in a first OS 1102. In this embodiment, the first application/OS 1102 produces files and/or databases that are not compatible with a second application executing in a second OS 1110. First application/OS 1102 subsequently produces print stream 1104 containing a source document. Then, print stream 1104 is received by converter 1106, representing a module of mapper 106. Converter 1106 proceeds to convert print stream 1104 into a converted file 1108, which conforms to a format supported by second application/OS 1110. The manner in which converter 1106 converts the print stream 1104 is described in greater detail below. Subsequently, second application/OS 1110 receives the converted file 1108.

In an embodiment of the present invention, the first application is not compatible with the second application and the first OS is not compatible with the second OS. In this case, the converter 1106 must convert between incompatible applications and operating systems. In another embodiment of the present invention, the first application is identical to the second application and the first OS is not compatible with the second OS. In this case, the converter 1106 must convert only between incompatible operating systems. In yet another embodiment of the present invention, the first application is not compatible with the second application and the first OS is identical to the second OS. In this case, the converter 1106 must convert only between incompatible applications.

In another embodiment of the present invention, the conversion process executed by converter 1106 also includes the conversion of a print stream into a format compatible with a particular type of printer. This embodiment is advantageous in situations where the first application/OS 1102 does not support a particular type of printer, such as an impact printer. Using the proposed invention, the print stream 1104 is converted into a format that is compatible with impact printers and provided to second application/Os 1110 for printing.

In yet another embodiment of the present invention, the converter 1106 is a separate software application that is available to user 102 for converting files. In this embodiment, upon the recognition that the documents produced by a first application/OS 1102 are not compatible with a second application/OS 1110, a user 102 accesses the converter 1106 and executes converter 1106 to convert the incompatible files at issue. In one alternative, the converter 1106 is available to user 102 on removable storage medium such as a CD or a floppy disk. In another alternative, the converter 1106 is available to user 102 for download from a web page or web site.

Figure 12:
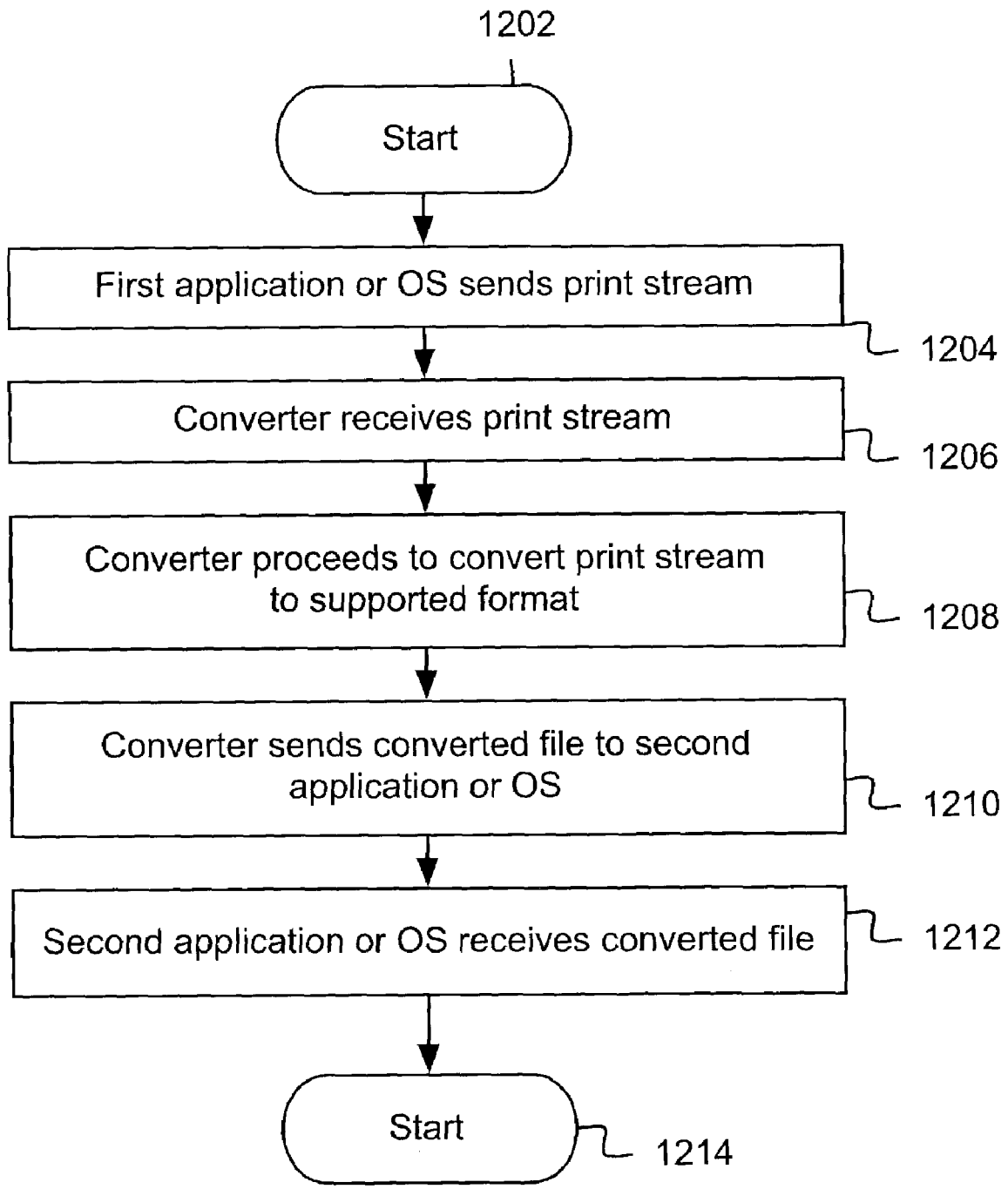
FIG. 12 is a flowchart depicting the operation and control flow of the file conversion process of FIG. 11 according to the present invention.

FIG. 12 is a flowchart depicting the operation and control flow of the file conversion process of FIG. 11 according to the present invention. FIG. 12 provides additional detail of the process represented by functional module 1106 of FIG. 11. The control flow of FIG. 12 begins with step 1202 and flows directly to step 1204. In step 1204, first application/OS 1102 produces a print stream 1104 containing a source document. In step 1206, converter 1106 receives the print stream 1104. In step 1208, converter 1106 converts the print stream 1104 into a format supported by second application or OS 1110.

In one embodiment of the present invention, converter 1106 accomplishes the task of step 1208 using a process similar to the process defined in FIG. 2 above. That is, for each type of source document, a template is generated which defines the content in the source document, and for each target document, a template is generated which defines the source of the content in the target document. Subsequently, the target document is generated upon the provision of a source document via a print stream. In another embodiment of the present invention, the converter 1106 accomplishes the task of step 1208 by modifying file header information or other file metadata information of the document extracted from print stream 1104 in order to generate a file that is compatible and readable by the second application/OS 1110. In step 1210, converter 1106 sends the converted file 1108 to the second application/OS 1110. In step 1212, the second application/OS 1110 receives the converted file 1108. In step 1214, the control flow of FIG. 12 ceases.

VII. PC Postage

In an embodiment of the present invention, the proposed invention can modify PC postage printed onto a business form or mailer, while adhering to security measures protecting PC postage from tampering. In this embodiment, the form generator 916 of the mapper 106 receives the PC postage for insertion into the target document. The form generator 916 receives the PC postage either from the source document in step 210 of FIG. 2 or directly from PC postage software provided by a PC postage provider during the target document generation step 214. Examples of current PC postage providers are Pitney-Bowes, Endicia, Stamps.com and Neopost. In the case where the PC postage is received directly from PC postage software, the user 102 is given the option of selecting the PC postage provider. Once the PC postage is received, the form generator 916 can proceed to reposition or rotate the PC postage during the target document generation step 214. In doing so, the security measures protecting the PC postage are followed. Furthermore, the postal regulations defining the proper placement of the PC postage are complied with. This allows the user 102 more flexibility in positioning the PC postage onto the business form or mailer.

VIII. Printing in a Secure Environment

Figure 14:
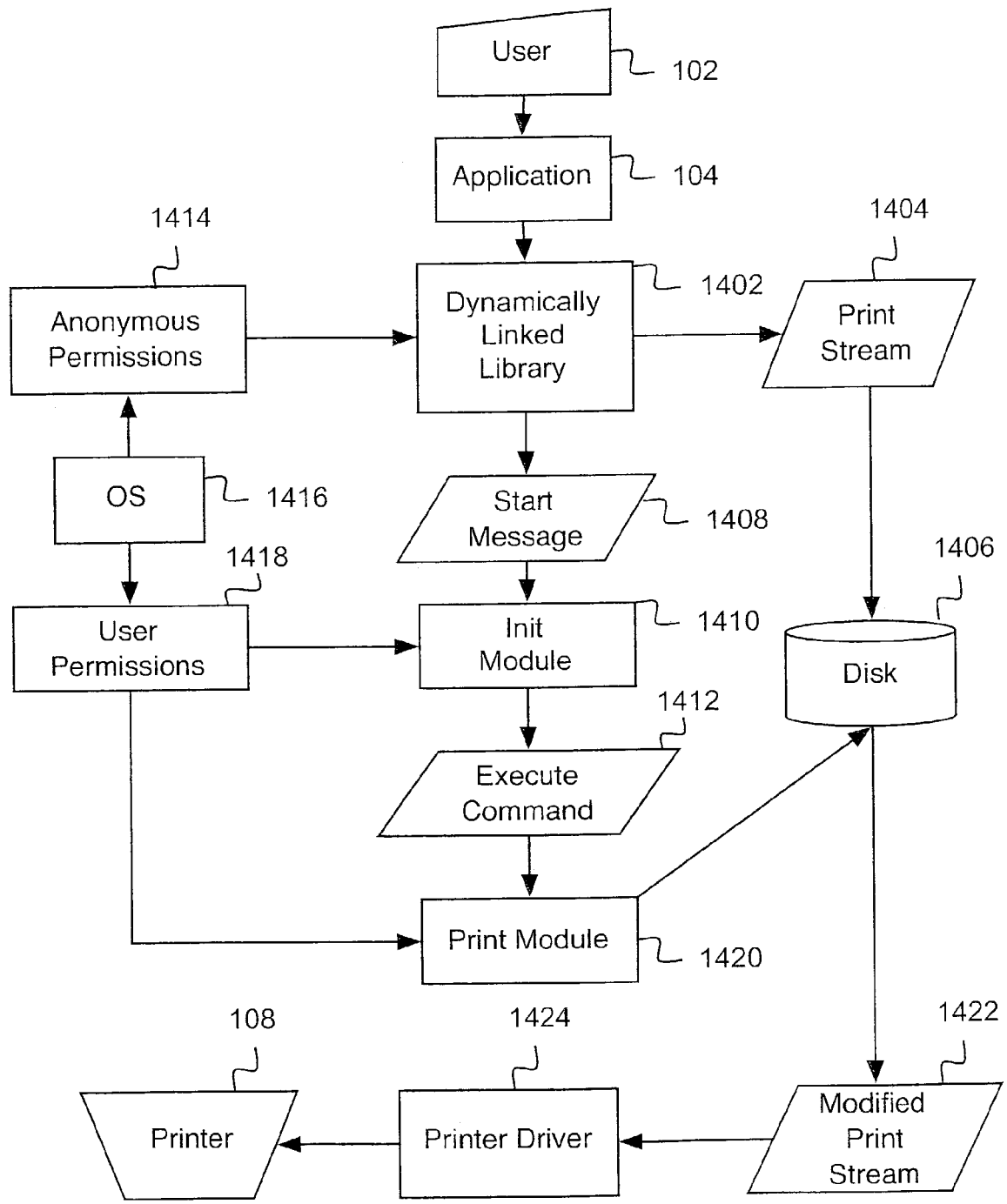
FIG. 14 is a functional diagram illustrating one embodiment of the printing process of the present invention.

FIG. 14 is a functional diagram illustrating one embodiment of the printing process of the present invention. The process illustrated in FIG. 14 begins with the user 102 using the application 104 to issue a print command. The print command is received by the dynamically linked library (DLL) 1402. Upon execution, the DLL 1402 is automatically assigned the permissions 1414 of the anonymous user account. This poses a problem as conflicts can arise between the permissions 1414 of the anonymous user account and the permissions 1418 of the current user account. For example, the current user account may have permission to print on certain printers, whereas the anonymous user account may not have such permission. Thus, it would be advantageous for the process of the present invention to adhere to the permissions of the current user account.

The DLL 1402 subsequently proceeds to produce a print data stream 1404 that is saved onto a floppy or a hard disk 1406. Next, the DLL 1402 sends a start message 1408 to the initiation module 1410. The initiation module 1410 receives the start message 1408 and proceeds to execute. Because the initiation module 1410 is spawned or executed by a DLL, it is automatically assigned the permissions 1418 of the current user account from the operating system 1416. Next, the initiation module 1410 issues an execute command 1412 to the print module 1420. In addition, the initiation module 1410 sends the permissions 1418 of the current user account to the print module 1420. The print module 1420 receives the execute command 1412 and the permissions 1418 and proceeds to execute. This solves the problem posed above, as the print module 1420, which will initiate the print process, adheres to the permissions of the current user account.

Upon execution, the print module 1420 proceeds to retrieve the print data stream 1404 from the disk 1406. Next, the print module 1420 modifies the print data stream 1404 to conform to a template that is specified by the user 102. The process of modifying a print stream to conform to a predefined template is discussed in greater detail above. Subsequently, a modified print data stream 1422 is generated by print module 1420. The modified print data stream 1422 is then sent to printer driver 1424 for printing. It should be noted that upon reception of the modified print data stream 1422 by printer driver 1424, the permissions of the current user account are evaluated. The printer driver 1424 proceeds to initiate printing of the modified print data stream 1422 on the printer 108 in compliance with the permissions of the current user account.

Figure 15:
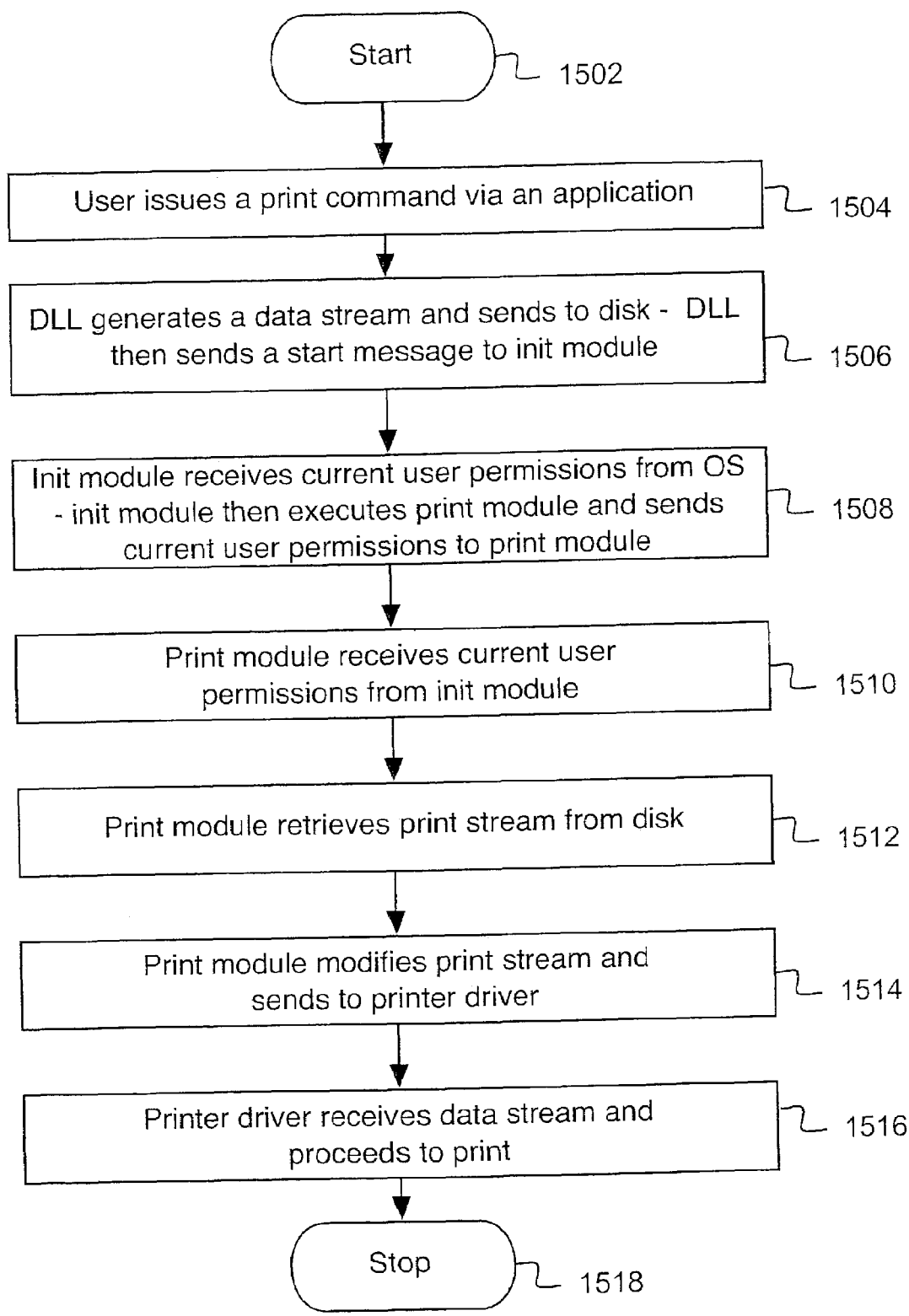
FIG. 15 is a flowchart depicting the operation and control flow of the embodiment of FIG. 14.

FIG. 15 is a flowchart depicting the operation and control flow of the embodiment of FIG. 14. The control flow of FIG. 15 begins with step 1502 and flows directly to step 1504. In step 1504, the user 102 issues a print command via an application 104. In step 1506, the print command is received by a DLL 1402. Upon execution, the DLL 1402 is automatically assigned the permissions 1414 of the anonymous user account. Subsequently, the DLL 1402 generates a print data stream 1404 and sends it to a disk 1406 for storage. Lastly, the DLL 1402 sends a start message 1408 to an initiation module 1410.

In step 1508, the initiation module 1410 executes in response to the start message 1408 and proceeds to receive current user account permissions 1418 from the operating system 1416. Subsequently, the initiation module 1410 issues an execute command 1412 to print module 1420. In addition, the initiation module 1410 sends the permissions 1418 of the current user account to the print module 1420. In step 1510, the print module 1420 executes in response to the execute command 1412 and proceeds to receive current user account permissions 1418 from the initiation module 1410.

In step 1512, the print module 1420 retrieves the print data stream 1404 from the disk 1406. Next, in step 1514, the print module 1420 modifies the print data stream 1404 to conform to a template that is specified by the user 102. Subsequently, a modified print data stream 1422 is generated by print module 1420 and sent to printer driver 1424 for printing. In step 1516, the printer driver 1424 proceeds to initiate printing of the modified print data stream 1422 on the printer 108 in compliance with the permissions of the current user account. In step 1518, the control flow of FIG. 15 ceases.

Figure 16:
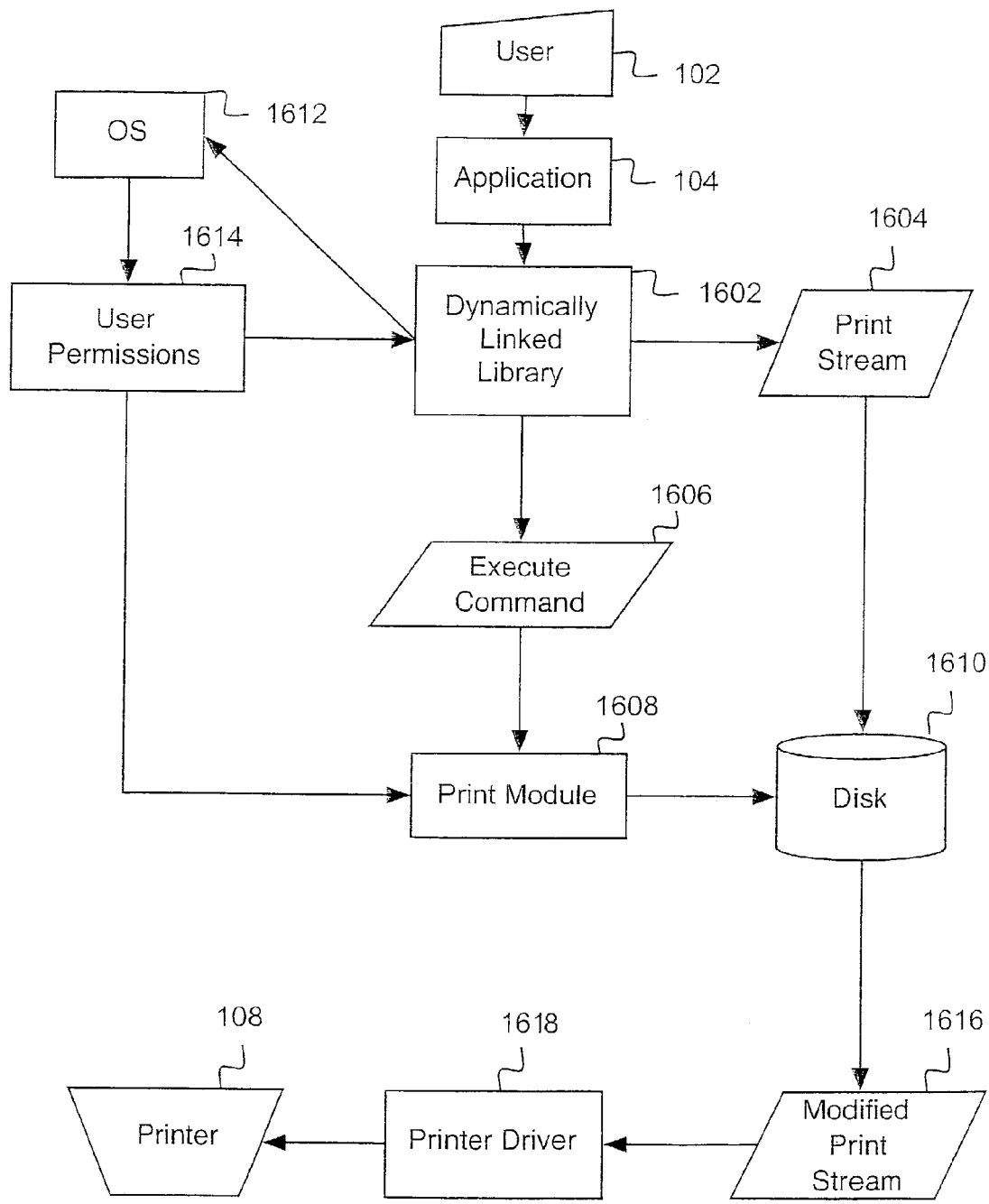
FIG. 16 is a functional diagram illustrating another embodiment of the printing process of the present invention.

FIG. 16 is a functional diagram illustrating another embodiment of the printing process of the present invention. The process illustrated in FIG. 16 begins with the user 102 using the application 104 to issue a print command. The print command is received by the DLL 1602.

Next, the DLL 1602 acquires access to the permissions 1614 of the current user account. The DLL 1602 can accomplish this task in a variety of ways. In one embodiment, the DLL 1602 prompts the user 102 to enter his authentication information (such as login and password), which is then used to acquire the permissions 1614 of the current user. In another embodiment, the DLL 1602 can read the operating system files associated with user accounts and determine the authentication information for the current user. The authentication information is then used to acquire the permissions 1614 of the current user account. In yet another embodiment, the DLL 1602 presents to the operating system 1612 a pointer to the permissions 1614 of the current user account. These permissions are then attributed to the user 102 by the operating system 1612. This feature solves the problem posed above, as the DLL 1602 adheres to the permissions of the current user account.

The DLL 1602 then proceeds to produce a print data stream 1604 that is subsequently saved onto a floppy or a hard disk 1610. Subsequently, the DLL 1602 sends an execute command 1606 to the print module 1608, as well as the permissions 1614 of the current user account. The print module 1608 receives the execute command 1606 and permissions 1614 and thus proceeds to execute.

Upon execution, the print module 1608 proceeds to retrieve the print data stream 1604 from the disk 1610. Next, the print module 1608 modifies the print data stream 1604 to conform to a template that is specified by the user 102. Subsequently, a modified print data stream 1616 is generated by print module 1608. The modified print data stream 1616 is then sent to printer driver 1618 for printing. It should be noted that upon reception of the modified print data stream 1616 by printer driver 1618, the permissions 1614 of the current user account are evaluated. The printer driver 1618 proceeds to initiate printing of the modified print data stream 1616 on the printer 108 in compliance with the permissions 1614 of the current user account.

Figure 17:
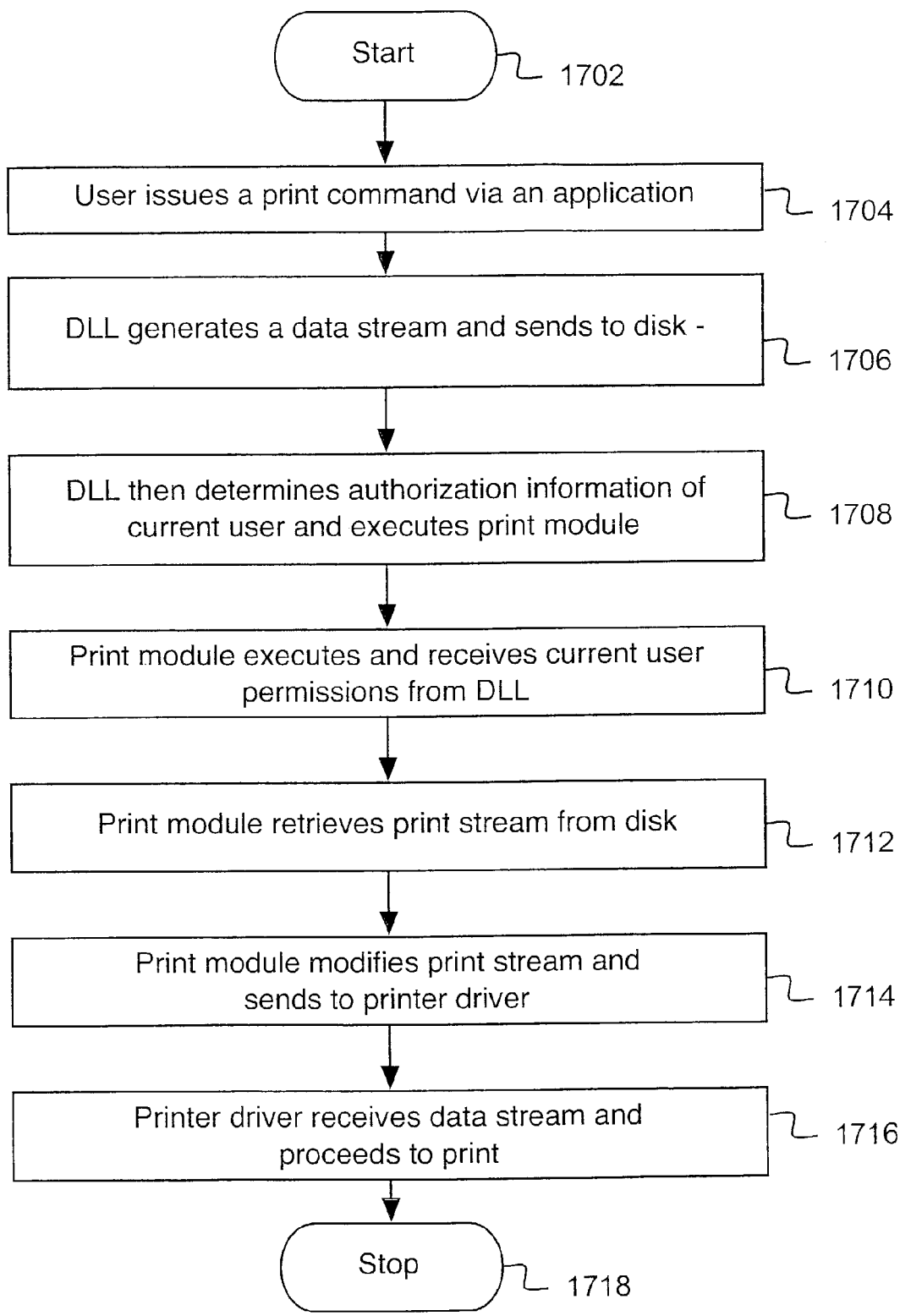
FIG. 17 is a flowchart depicting the operation and control flow of the embodiment of FIG. 16.

FIG. 17 is a flowchart depicting the operation and control flow of the embodiment of FIG. 16. The control flow of FIG. 17 begins with step 1702 and flows directly to step 1704. In step 1704, the user 102 issues a print command via an application 104. In step 1706, the DLL 1602 generates a print data stream 1604 and sends it to a disk 1610 for storage. In step 1708, the DLL 1602 determines the authentication information of the current user and acquires the permissions 1614 of the current user account. This is described in greater detail above. Also, the DLL 1602 sends an execute command 1606 to the print module 1608.

In step 1710, the print module 1608 executes in response to the execute command 1606 and proceeds to receive current user permissions 1614 from the DLL 1602. In step 1712, the print module 1608 retrieves the print data stream 1604 from the disk 1610. Next, in step 1714, the print module 1608 modifies the print data stream 1604 to conform to a template that is specified by the user 102. Subsequently, a modified print data stream 1616 is generated by print module 1608 and sent to printer driver 1618 for printing. In step 1716, the printer driver 1618 proceeds to initiate printing of the modified print data stream 1616 on the printer 108 in compliance with the permissions 1614 of the current user account. In step 1718, the control flow of FIG. 17 ceases.

IX. Content Protection in a Multi-user Computer System

Figure 18:
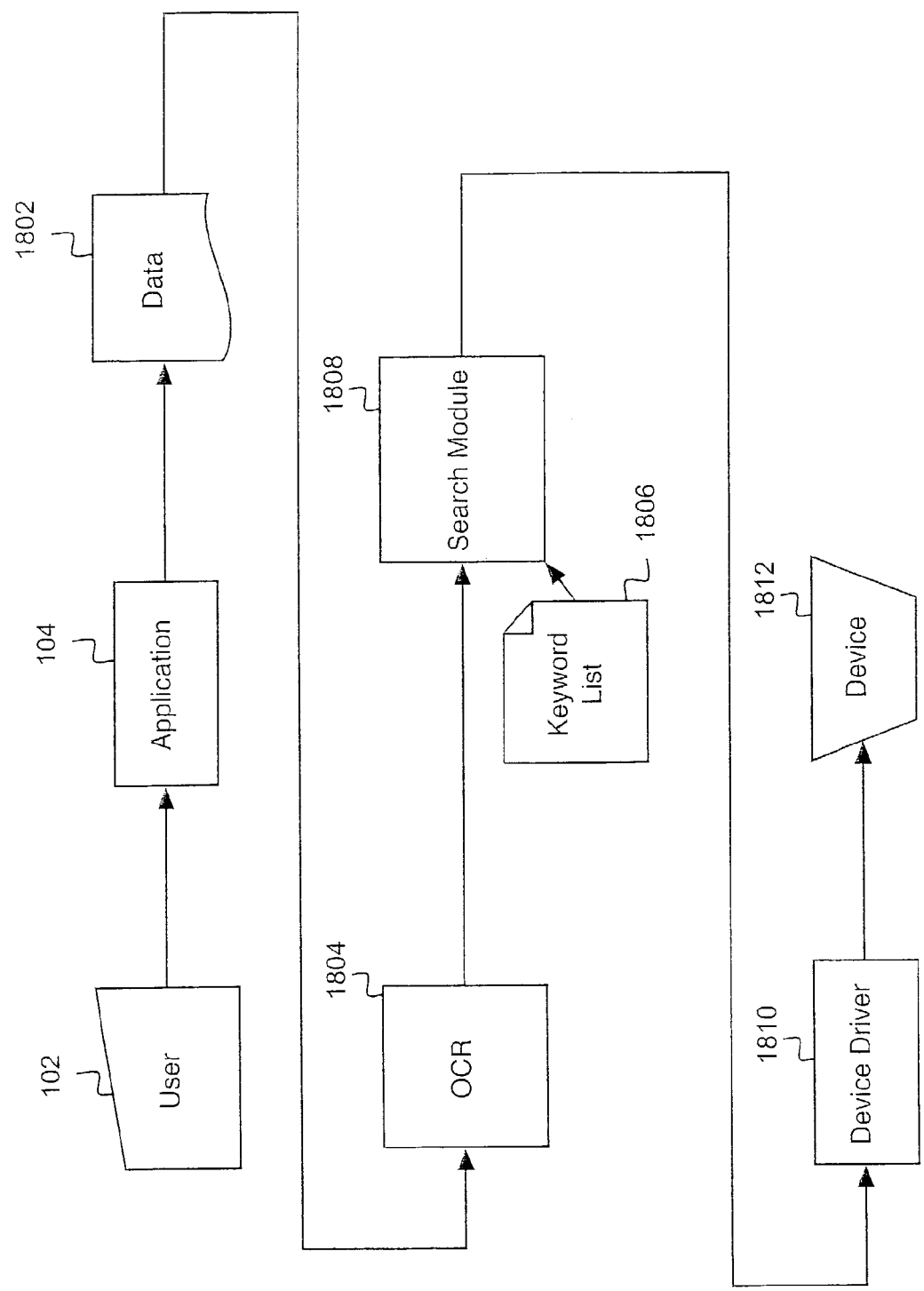
FIG. 18 is a functional diagram illustrating the content protection process of one embodiment of the present invention.

FIG. 18 is a functional diagram illustrating the content protection process of one embodiment of the present invention. The content protection process of FIG. 18 begins with the user 102 utilizing application 104 to send data 1802 to a device 1812 via a device driver 1810. The data 1802 is any file containing data, such as a document, a text file, an audio file and a video file. The device 1812 is any computer data storage or output device. For example, device 1812 can be a hard drive, a floppy drive, removable storage media, a printer, an audio speaker, a network location or an Internet location. The process of FIG. 18 is performed when an attempt or a request is made to send data 1802 to any such device 1812.

Upon reception of the request, an optical character recognition (OCR) module 1804 receives the data 1802 and proceeds to generate a text representation of the information in data 1802 using OCR techniques. OCR techniques are commonly known to one of ordinary skill in the art. It should be noted that the OCR step is only executed if the data 1802 is in a binary form that can be processed by OCR. A PostScript file format or a TIFF file format are examples of formats that can be processed by OCR. If the data 1802 were, for example, text data, then the OCR process would be unnecessary and the search process of search module 1808 would be initiated.

Next, the text representation of data 1802 is provided to search module 1808. Search module 1808 then reads in a keyword list 1806. The keyword list 1806 comprises a list of text words that are typically associated with documents or files that should be kept confidential or secret. An example of a keyword list is shown below:
confidential
secret
trade secret
privileged Subsequently, the search module 1808 searches the text representation of data 1802 for the keywords in the keyword list 1806. If the search module 1808 finds any of the keywords in keyword list 1806 in the text representation of data 1802, then the user 102 is denied access to the device 1812. In one alternative, the user 102 is prompted to enter authentication information in order to gain access to the device 1812. If the entered information is deemed to be authentic, then the user 102 is granted access to the device 1812.

If the search module 1808 does not find any of the keywords in keyword list 1806 in the text representation of data 1802, then the user 102 is granted access to the device 1812. Consequently, the data 1802 is sent to device driver 1810, which proceeds to process the data 1802 on the device 1812.

Figure 19:
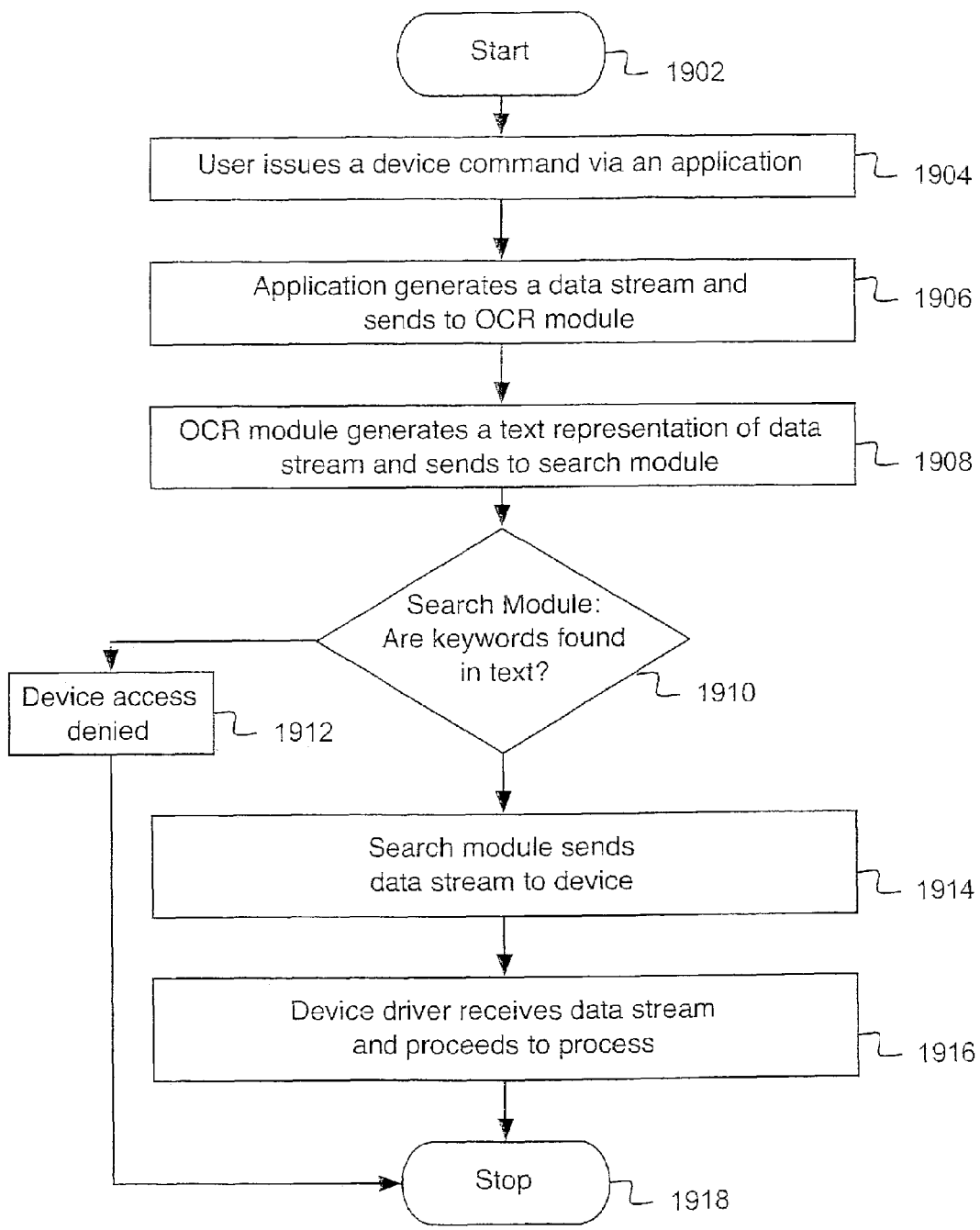
FIG. 19 is a flowchart depicting the operation and control flow of the embodiment of FIG. 18.

FIG. 19 is a flowchart depicting the operation and control flow of the embodiment of FIG. 18. The control flow of FIG. 19 begins with step 1902 and flows directly to step 1904. In step 1904, a user 102 issues, via an application 104, a data process command to a device 1812. The data process command involves the use of data 1802. A data process command is any command issued to a device that involves the processing of data. Examples of a data process command includes, a command for storing data on a hard disk, a command for printing data on a printer and a command for playing audio data on an audio speaker.

In step 1906, the application 104 generates data 1802, which is received by the OCR module 1804. In step 1908, the OCR module 1804 generates a text representation of the information in data 1802 using OCR techniques. Next, the text representation of data 1802 is provided to search module 1808. As explained above, if the data 1802 is not in a format that can be processed by OCR, then the OCR step 1908 would not be executed and no text representation of data 1802 would be generated for search module 1808. If, however, the data 1802 were already in a text format, then the data 1802 would be immediately provided to search module 1808 and the OCR step 1908 would be bypassed altogether. In this case, control would flow from step 1906 directly to step 1910.

In step 1910, the search module 1808 searches the text representation of data 1802 for the keywords in the keyword list 1806. If the search module 1808 finds any of the keywords in keyword list 1806 in the text representation of data 1802, then the user 102 is denied access to the device 1812 in step 1912. Optionally, in step 1912, the user 102 is prompted to enter authentication information in order to gain access to the device 1812 in steps 1914-1916. If the entered information is deemed to be authentic, then the user 102 is granted access to the device 1812. If the search module 1808 does not find any of the keywords in keyword list 1806 in the text representation of data 1802, then the user 102 is granted access to the device 1812 in steps 1914-1916.

In step 1914, the data 1802 is sent to device driver 1810. In step 1916, device driver 1810 proceeds to process the data 1802 on the device 1812. In step 1918, the control flow of FIG. 19 ceases.

X. Data Capture During the Print Process

Figure 20A:
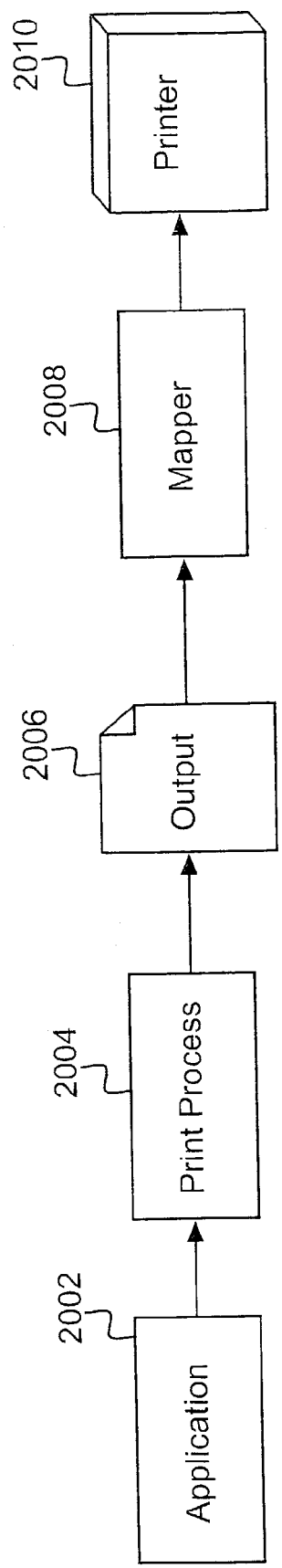
FIG. 20A is a block diagram illustrating a printing system architecture according to one embodiment of the present invention.

FIG. 20A is a block diagram illustrating a printing system architecture according to one embodiment of the present invention. The FIG. 20A shows a printing system architecture as used by the embodiments of the present invention depicted in Section V The Mapper (see FIG. 9) and Section VIII Printing in a Secure Environment (see FIG. 14). The FIG. 20A shows an application 2002, which is a word processor, a financial management suite, or the like. The application 2002 commences a print process 2004, which ultimately produces an output 2006—a print data stream. The intermediate processes performed by print process 2004 are inconsequential as only the print data stream, output 2006, is necessary. Next, the mapper 2008 reads and processes the print data stream, output 2006, to conform to a predetermined template, as described in greater detail above. Then, the processed print data stream is sent to printer 2010 for printing.

Figure 20B:
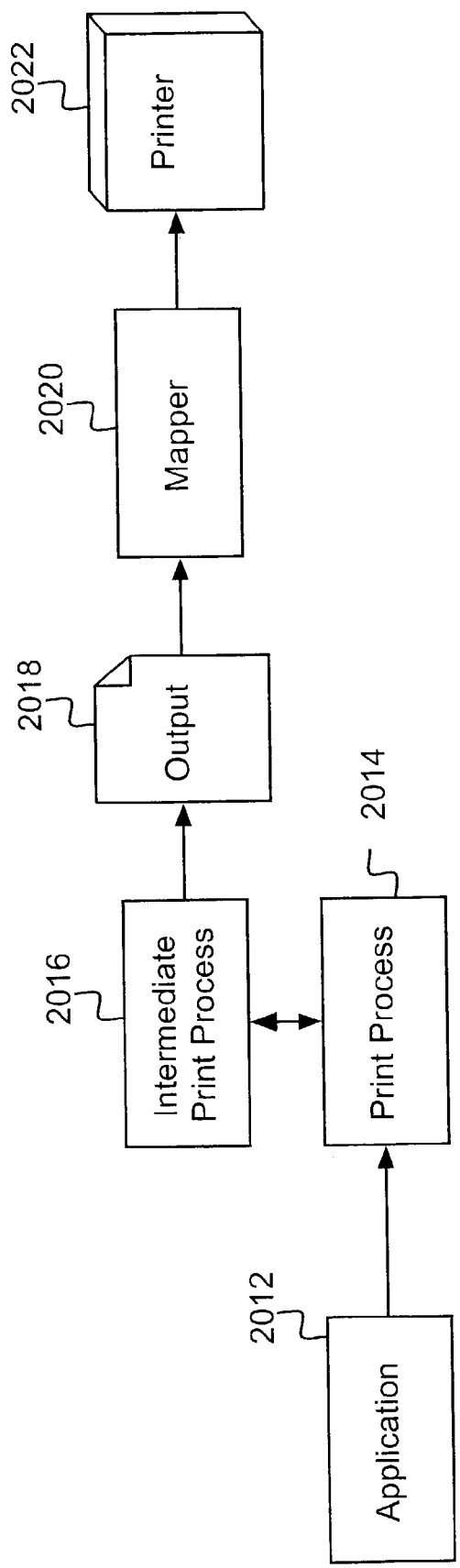
FIG. 20B is a block diagram illustrating a printing system architecture according to another embodiment of the present invention.

FIG. 20B is a block diagram illustrating a printing system architecture according to another embodiment of the present invention. In contrast to FIG. 20A, the FIG. 20B shows a printing system architecture as used by another embodiment of the present invention, described below. The FIG. 20B also shows an application 2012, which is a word processor, a financial management suite, or the like. The application 2012 commences a print process 2014. The data capture portion of the present embodiment becomes involved in the print process 2014 before a print data stream is created by the print process 2014. This is described in greater detail below. Intermediate print process 2016 communicates with the print process 2014 before a print data stream is created by the print process 2014. Intermediate print process 2016 then produces an output file 2018. Next, the mapper 2020 reads and processes the output file 2018, to conform to a predetermined template, as described in greater detail above. Then, the processed output file 2018 is sent to printer 2022 for printing.

Figure 21:
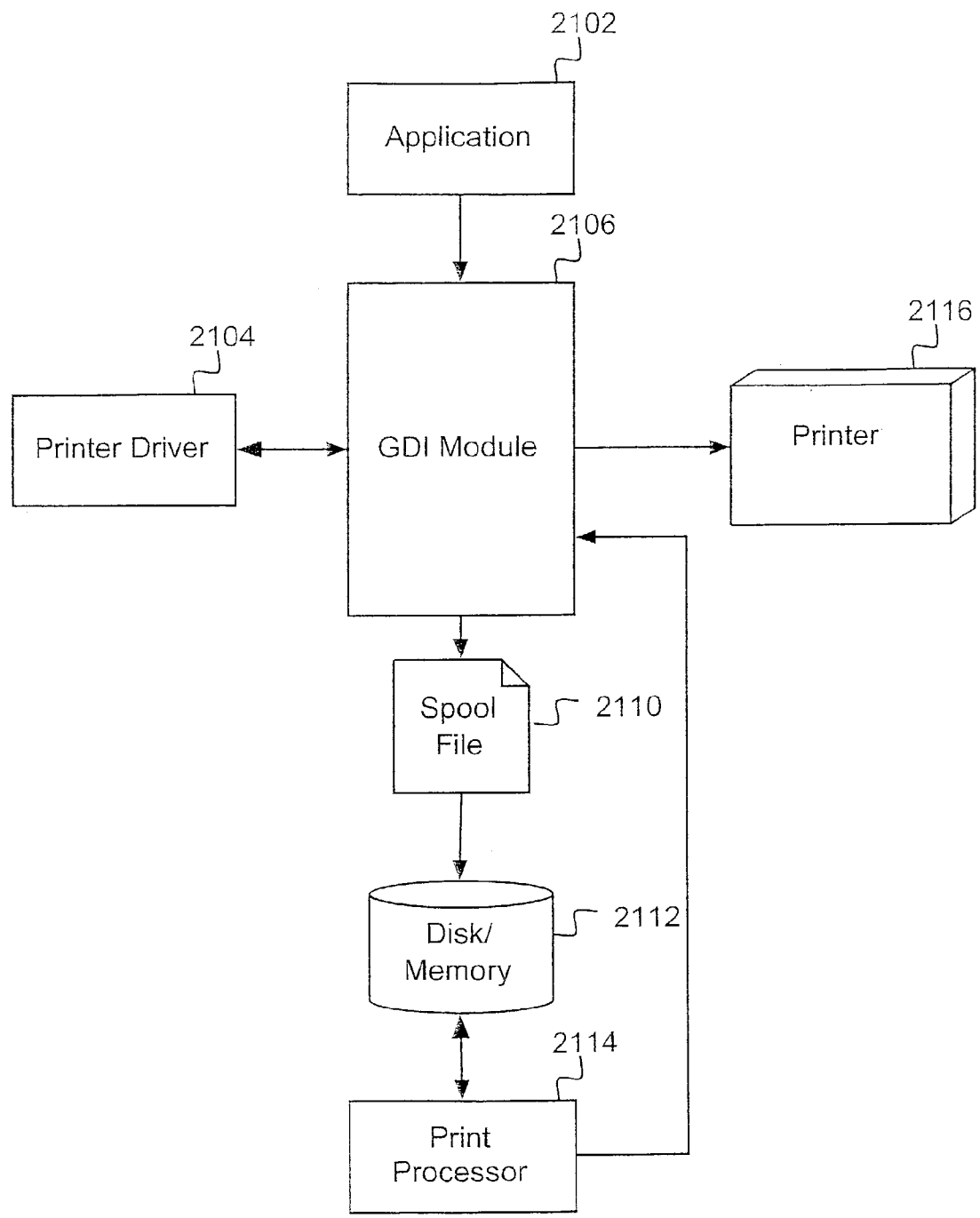
FIG. 21 is a block diagram illustrating a conventional printing process.

FIG. 21 is a block diagram illustrating a conventional printing process. FIG. 21 shows an application 2102 (corresponding to application 104 of FIG. 1) that issues a print request pertaining to a document. The print process begins with the application 2102 creating a device context and writing the objects of the document (images, text, etc.) to the device context. Next, the application 2102 calls the Graphical Display Interface (GDI) module 2106 with the print request for a particular printer (printer 2116, corresponding to printer 108 of FIG. 1) using the device context. The GDI module 2106 then calls the printer driver 2104 with a request for instructions on how to render on printer 2116 the objects that were written to the device context. The printer driver 2104 returns instructions to the GDI module 2106 on how to render on printer 2116 the objects that were written to the device context. Next, the GDI module 2106 calls its internal spooler which proceeds to generate a spool file 2110. A spool file is a file holding instructions on how to render certain print objects on a particular printer. A spool file is written in a condensed format.

Next, the spooler writes the spool file 2110 to a disk or memory 2112, which resides on the computer system on which the current print process is executing. Then, a print processor 2114 proceeds to read the spool file 2110 from the disk or memory 2112 and send it to the GDI module 2106. The spool file 2110 is disassembled by the GDI module 2106 and the individual instructions on how to render certain print objects on a particular printer are sent to the printer 2116. The printer 2116 then proceeds to print the document described by the instructions in the spool file 2110.

Figure 22:
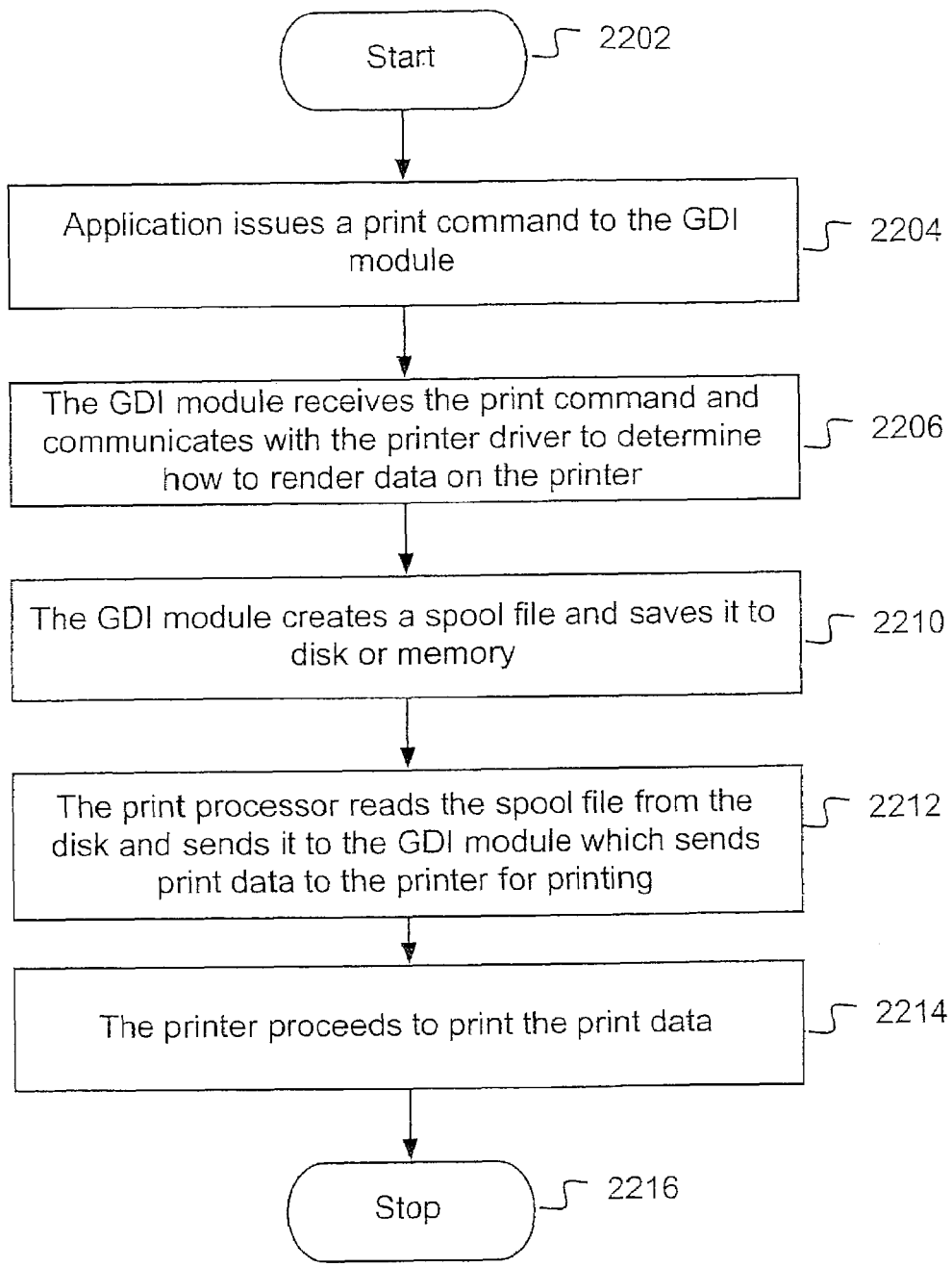
FIG. 22 is a flowchart depicting the operation and control flow of the conventional printing process of FIG. 21.

FIG. 22 is a flowchart depicting the operation and control flow of the conventional printing process of FIG. 21. The control flow of FIG. 22 begins with step 2202 and proceeds directly to step 2204. In step 2204, application 2102 (corresponding to application 104 of FIG. 1) issues a print command to the GDI module 2106 pertaining to a document. Application 2102 creates a device context and writes the objects of the document (images, text, etc.) to the device context. Application 2102 calls the GDI module 2106 with the print command for a particular printer (printer 2116, corresponding to printer 108 of FIG. 1) using the device context. In step 2206, GDI module 2106 receives the print command then calls the printer driver 2104 with a request for instructions on how to render on printer 2116 the objects that were written to the device context. The printer driver 2104 returns instructions to the GDI module 2106 on how to render on printer 2116 the objects that were written to the device context.

In step 2210, the GDI module 2106 proceeds to generate a spool file 2110 written in a condensed format. Next, the spooler writes the spool file 2110 to a disk or memory 2112, which resides on the computer system on which the current print process is executing. In step 2212, a print processor 2114 proceeds to read the spool file 2110 from the disk or memory 2112 and send it to GDI module 2106. The spool file 2110 is disassembled by the GDI module 2106 and the individual instructions on how to render certain print objects on a particular printer are sent to the printer 2116. In step 2214, the printer 2116 then proceeds to print the document described by the instructions in the spool file 2110. In step 2216, the control flow of FIG. 22 ceases.

Figure 23:
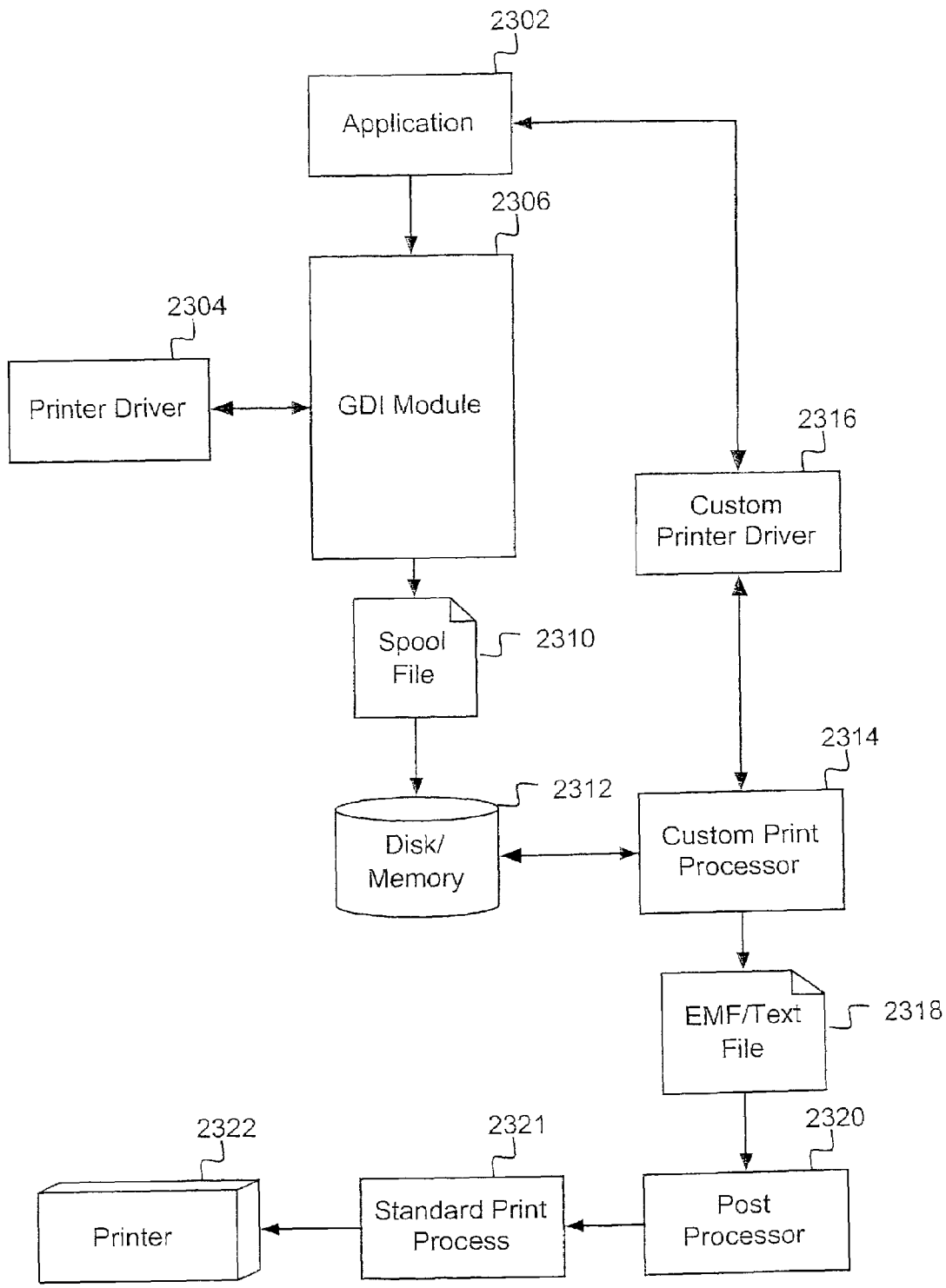
FIG. 23 is a block diagram illustrating the printing process according to one embodiment of the present invention.

FIG. 23 is a block diagram illustrating the printing process according to one embodiment of the present invention. FIG. 23 shows an application 2302 (corresponding to application 104 of FIG. 1) that issues a print request pertaining to a document. The print process begins with the application 2302 creating a device context and writing the objects of the document (images, text, etc.) to the device context. Next, the application 2302 calls the GDI module 2306 with the print request for a particular printer (printer 2322, corresponding to printer 108 of FIG. 1) using the device context. The GDI module 2306 then calls the printer driver 2304 with a request for instructions on how to render on printer 2322 the objects that were written to the device context. The printer driver 2304 returns instructions to the GDI module 2306 on how to render on printer 2322 the objects that were written to the device context. Next, the GDI module 2306 calls its internal spooler which proceeds to generate a spool file 2310 written in a condensed format, such as in EMF.

Next, the spooler writes the spool file 2310 to a disk or memory 2312, which resides on the computer system on which the current print process is executing. Then, a custom print processor 2314 proceeds to read the spool file 2310 from the disk or memory 2312. The custom print processor 2314 is a process implemented in software, hardware, or a combination of both. The custom print processor 2314 communicates with the custom printer driver 2316.

The custom printer driver 2316 operates as a front end to the custom print processor 2314. The custom printer driver 2316 holds user customizable settings and instructions that are processed by the custom print processor 2314 during print processing. For example, the custom printer driver 2316 holds information regarding where (a directory path) the custom print processor 2314 writes output files. The custom printer driver 2316 also holds information regarding the format—text or EMF or both—of the custom print processor 2314 output files. The custom printer driver 2316 also holds instructions regarding when the custom print processor 2314 generates output files of a particular format. An example of such instructions are: if the destination template does not require extraction of images from the source document, then generate an output file in text format; if the destination template requires extraction of images from the source document, then generate an output file in EMF format.

FIG. 23 also shows a connection between the custom printer driver 2316 and the application 2302. This connection illustrates an interface in the application 2302 that allows the user of the system of the present invention to input user customizable settings for the custom print processor 2314 via the custom printer driver 2316. In an example, the user is provided with a dialog box via the application 2302 for inputting such settings as: location of output file, format of output file and instructions on when to use certain output file formats.

Returning to the custom print processor 2314, the custom print processor 2314 disassembles the spool file 2310 and the individual instructions on how to render certain print objects on a particular printer are read. Then, the custom print processor 2314 produces an output file 2318 containing the information in the spool file 2310. The format of the output file 2318 is dependant on the user customizable settings that are specified at the custom printer driver 2316, as described in greater detail above. In one example, if the destination template requires only text information, then an output file 2318 is generated in text format; if the destination template requires image information, then an output file 2318 in EMF format is generated.

Next, the output file 2318 is sent to the post processor 2320. The post processor 2320 encompasses any of the pre-printing processes of the present invention, as described in greater detail above. In one embodiment of the present invention, post processor 2320 encompasses the processes performed by the mapper 106, as described in step 214 of FIG. 2. In another embodiment of the present invention, post processor 2320 encompasses the processes performed by the converter 1106 of FIG. 11. In another embodiment of the present invention, post processor 2320 encompasses the processes performed by the search module 1808 of FIG. 18. In another embodiment of the present invention, post processor 2320 encompasses a process by which the text information in output file 2318 in EMF or text format is translated into a different language.

In the embodiment where the post processor 2320 encompasses the processes performed by the mapper 106, as described in step 214 of FIG. 2, information from the output file 2318 in EMF or text format is garnered using a source template 912 (see FIG. 9). During the process, coordinate information within the output file 2318 in EMF or text format is used. An EMF file contains coordinate information corresponding to text described in the EMF file. The coordinate information provides data as to the location of the corresponding text in the final printed document. The source template 912 includes coordinate information regarding the location of desired text in the source document. Thus, the coordinate information in the output file 2318 is matched with the coordinate information in the source template 912 to garner the desired text from the output file 2318. No additional information, such as a special font used in the output file 2318, is needed for garnering the desired text from the output file 2318.

Subsequent to post processing, the post processor 2320, sends the resulting data to the standard print process 2321. The standard print process 2321 is the conventional print process described in FIG. 21. The standard print process 2321 results in the printing of the data at the printer 2322.

In an embodiment of the present invention, the output file 2318 can be distributed over a network via email, FTP, virtual networking or any other mechanism for transferring information over a network. The conventional process for sending a document over a network is to save the document in a word processing format, such as Portable Document Format (PDF). Saving certain data, such as graphics, in PDF format is a lossy procedure. Subsequently, the document is transferred over a network. The recipient then receives the document and prints it out. During printing, the document is converted back to an EMF format. The conventional process described, however, incurs inefficiencies as the document must be converted from EMF to PDF and then back to EMF. Each conversion can be lossy, which results in an overall degradation of information quality over the whole process. In this embodiment, the transferring of a document in EMF format eliminates the information quality degradation problem described above.

In an embodiment of the present invention, the output file 2318 can be transferred over a network for printing purposes. In this embodiment, a user on a remote network generates an output file 2318 in EMF format and transfers the output file 2318 to another network for printing. This is advantageous as an EMF file, as opposed to a PDF file, retains high information quality (no degradation). In another embodiment of the present invention, EMF files transferred over a network for printing are compressed before transmission. This is advantageous as it allows for a reduction in network traffic for remote printing.

The foregoing aspects of the present invention, namely the use of the custom print processor 2314, are advantageous because it is not necessary to return the print data to the GDI module 2306 before further processing. The conventional print process as described in FIG. 21 shows that the print processor 22114 must return the print data to the GDI module 2106 before it is processed and sent to the printer 2116. In the present invention, the custom print processor 2314 processes the print data and then sends it to the post processor 2320 for further processing before it is subsequently printed. Thus, it is not necessary to send the print data back to the GDI module 2106 before it is processed and sent to the printer 2116. This results in a more efficient print process as it reduces the processing requirements and processing time.

In addition, the foregoing aspects of the present invention, namely the use of an EMF or text file 2320, are advantageous because the parsing of an EMF or text file 2320 requires less processing then the use of Optical Character Recognition (OCR) on a print stream. In an embodiment of the present invention, the parser 910, as described in FIG. 9, performs OCR on a print stream in order to extract information for further processing. In another embodiment of the present invention, however, an EMF or text file 2320 is parsed for the desired information, which is then extracted. Thus, the process of parsing of an EMF or text file 2320 for extracting information results in a more efficient system for extracting information.

Figure 24A:
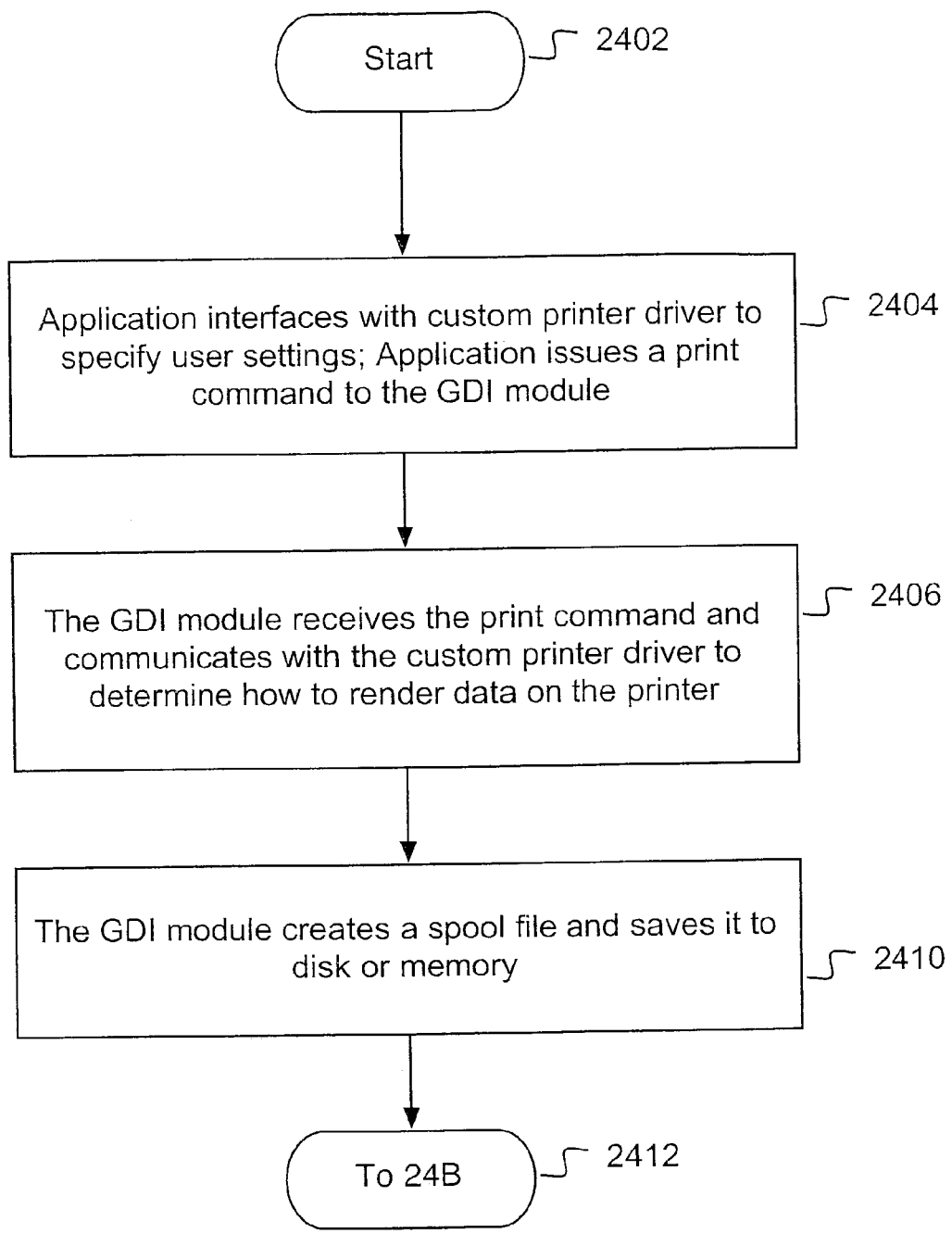
FIG. 24A and FIG. 24B are a flowchart depicting the operation and control flow of the printing process according to the embodiment of FIG. 23.
Figure 24B:
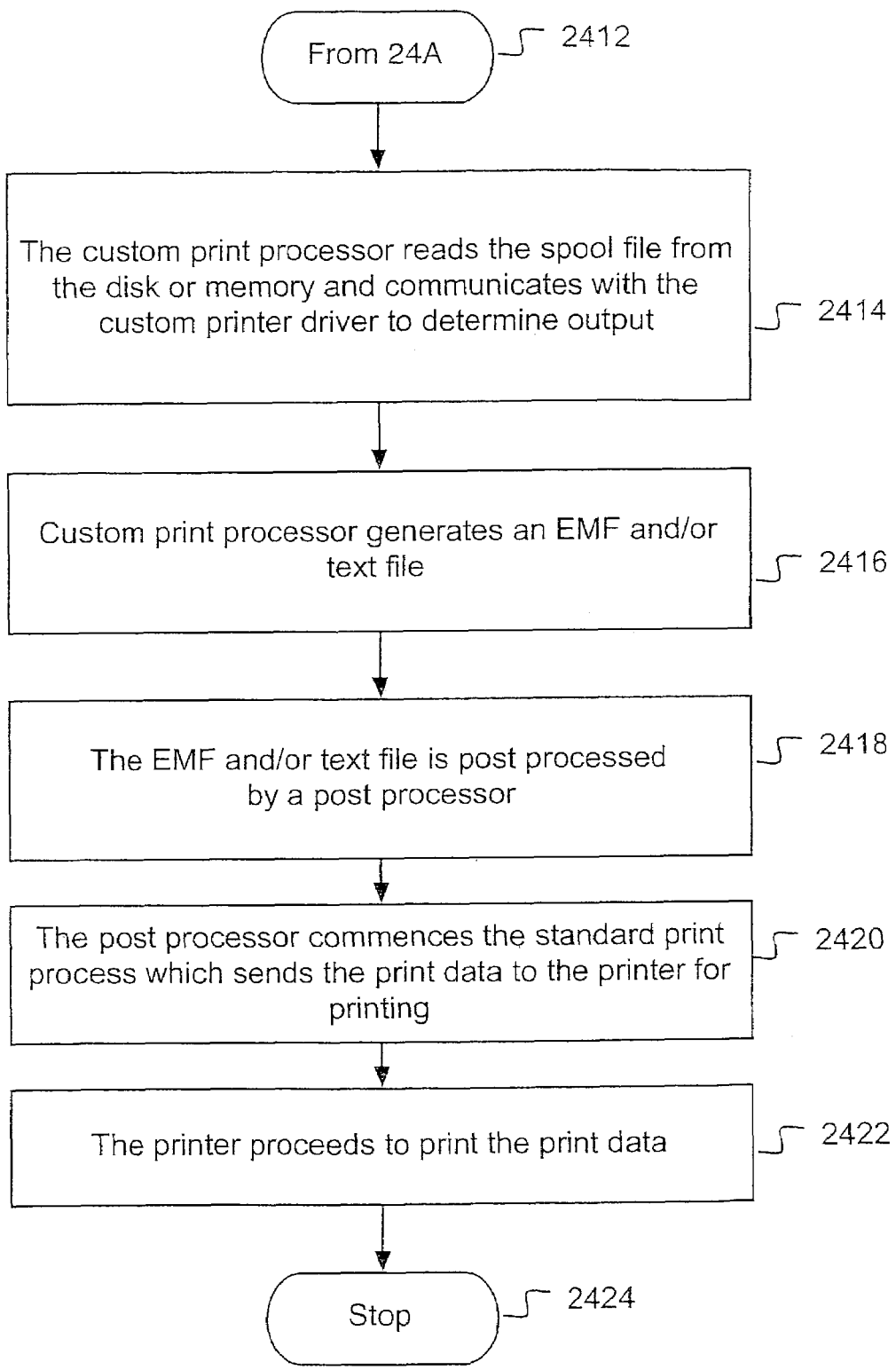

FIG. 24A and FIG. 24B are a flowchart depicting the operation and control flow of the printing process according to the embodiment of FIG. 23. The control flow of FIG. 24A and FIG. 24B begins with step 2402 and proceeds directly to step 2404. In step 2404, application 2302 issues a print command to GDI 2306 pertaining to a document. Application 2302 creates a device context and writes the objects of the document (images, text, etc.) to the device context. Application 2302 calls the GDI 2306 with the print command for a particular printer (printer 2322, corresponding to printer 108 of FIG. 1) using the device context. Also in step 2404, the application 2302 interfaces with the custom printer driver 2316 to read the user specified settings used during print processing. The user specified settings are described in greater detail above.

In step 2406, GDI 2306 receives the print command and calls the custom printer driver 2316 with a request for instructions on how to render on printer 2322 the objects that were written to the device context. The custom printer driver 2316 returns instructions to the GDI 2306 on how to render on printer 2322 the objects that were written to the device context.

In step 2410, the GDI 2306 proceeds to generate a spool file 2310 written in a condensed format. Next, the GDI 2306 writes the spool file 2310 to a disk or memory 2312, which resides on the computer system on which the current print process is executing. Step 2412 of FIG. 24A corresponds to step 2412 of FIG. 24B. The control flow of FIG. 24A proceeds directly to FIG. 24B via step 2412.

In step 2414, a custom print processor 2314 proceeds to read the spool file 2310 from the disk or memory 2312. The custom print processor 2314 also communicates with the custom printer driver 2316 with regards to instructions on how to produce output files. As explained above, the custom printer driver 2316 holds user customizable settings and instructions that are processed by the custom print processor 2314 during print processing.

In step 2416, the custom print processor 2314 disassembles the spool file 2310 and the individual instructions on how to render certain print objects on a particular printer are read. Then, the custom print processor 2314 produces an output file 2318 containing the information in the spool file 2310. The format of the output file 2318 is dependant on the user customizable settings that are specified at the custom printer driver 2316, as described in greater detail above. In one example, if the destination template requires only text information, then an output file 2318 is generated in text format; if the destination template requires image information, then an output file 2318 in EMF format is generated.

In step 2418, the output file 2318 is sent to the post processor 2320. As explained above, the post processor 2320 encompasses pre-printing processes of the present invention, such as the mapper 106, the converter 1106 and the search module 1808. In step 2420, subsequent to post processing, the post processor 2320 sends the resulting data to the standard print process 2321. The standard print process 2321 is the conventional print process described in FIG. 21. The standard print process 2321 results in the printing of the data at the printer 2322 in step 2422. In step 2424, the control flow of FIG. 24A and FIG. 24B ceases.

XI. Exemplary Implementation

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

An embodiment of the present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

A computer system may include, inter alia, one or more computers and at least a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer system to read such computer readable information.

Figure 13:
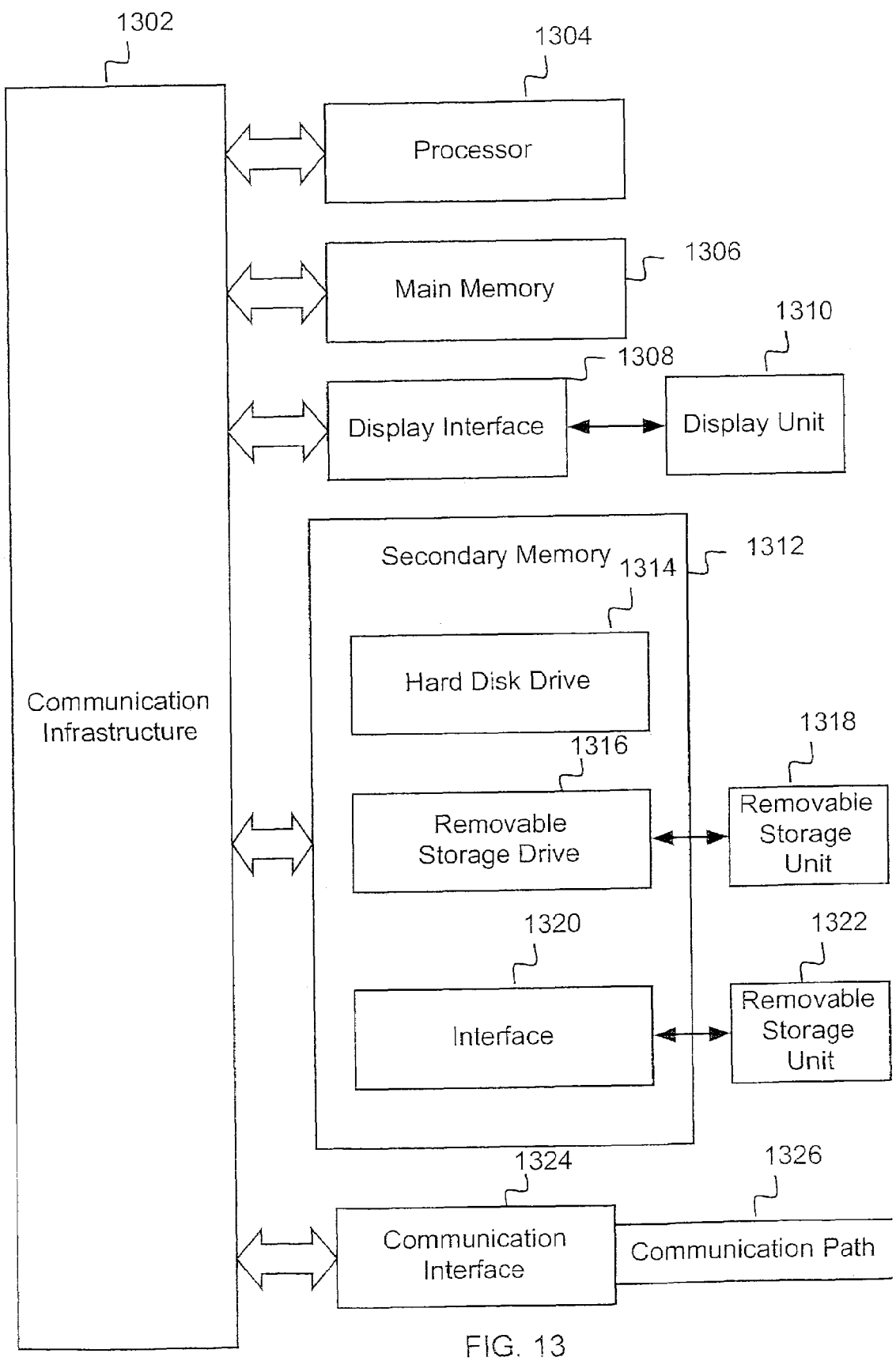
FIG. 13 is a block diagram of a computer system useful for implementing the present invention.

FIG. 13 is a block diagram of a computer system useful for implementing an embodiment of the present invention. The computer system includes one or more processors, such as processor 1304. The processor 1304 is connected to a communication infrastructure 1302 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 1308 that forwards graphics, text, and other data from the communication infrastructure 1302 (or from a frame buffer not shown) for display on the display unit 1310. The computer system also includes a main memory 1306, preferably random access memory (RAM), and may also include a secondary memory 1312. The secondary memory 1312 may include, for example, a hard disk drive 1314 and/or a removable storage drive 1316, representing a floppy disk drive, a magnetic tape drive, an optical disk drive, etc. The removable storage drive 1316 reads from and/or writes to a removable storage unit 1318 in a manner well known to those having ordinary skill in the art. Removable storage unit 1318, represents a floppy disk, magnetic tape, optical disk, etc. which is read by and written to by removable storage drive 1316. As will be appreciated, the removable storage unit 1318 includes a computer usable storage medium having stored therein computer software and/or data.

In alternative embodiments, the secondary memory 1312 may include other similar means for allowing computer programs or other instructions to be loaded into the computer system. Such means may include, for example, a removable storage unit 1322 and an interface 1320. Examples of such may include a program cartridge and cartridge interface (such as that found in video game devices), a removable memory chip (such as an EPROM, or PROM) and associated socket, and other removable storage units 1322 and interfaces 1320 which allow software and data to be transferred from the removable storage unit 1322 to the computer system.

The computer system may also include a communications interface 1324. Communications interface 1324 allows software and data to be transferred between the computer system and external devices. Examples of communications interface 1324 may include a modem, a network interface (such as an Ethernet card), a communications port, a PCM-CIA slot and card, etc. Software and data transferred via communications interface 1324 are in the form of signals which may be, for example, electronic, electromagnetic, optical, or other signals capable of being received by communications interface 1324. These signals are provided to communications interface 1324 via a communications path (i.e., channel) 1326. This channel 1326 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 1306 and secondary memory 1312, removable storage drive 1316, a hard disk installed in hard disk drive 1314, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information.

Computer programs (also called computer control logic) are stored in main memory 1306 and/or secondary memory 1312. Computer programs may also be received via communications interface 1324. Such computer programs, when executed, enable the computer system to perform the features of the present invention as discussed herein. In particular, the computer programs, when executed, enable the processor 1304 to perform the features of the computer system. Accordingly, such computer programs represent controllers of the computer system.

XII. Conclusion

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A method for capturing data during a print process, the method comprising:

displaying on a graphical user interface of a template for receiving information being parsed from a spool file, wherein in the template is an image of the consumable business form with at least one of the target zones for printing at least a portion of the information from the spool file thereon;

graphically indicating on the graphical user interface a plurality of target zones in the template for printing the information from the spool file thereon;

observing a print command issued by an application for a particular printer;

reading the spool file written to memory in response to the print command, wherein the spool file is written in an Extended Metafile Format (EMF) which is printer independent;

parsing information from the spool file;

generating an output file containing the information which has been parsed from the spool file;

modifying the output file to conform to the template, wherein the template includes a plurality of target zones to print information which has been parsed from the spool file with information to a specific addressee; and converting the output file that was modified into a final print data stream for the particular printer.

2. The method of claim 1, further comprising:

receiving at least one user customizable settings for instructions on when to use certain formats for the output file, and wherein the generating the output file includes generating the output file in a format based on the customizable settings.

3. The method of claim 2, wherein the format of the output file is EMF if the spool file contains image information, and wherein the format of the output file is text format if the spool file does not contain image information.

4. The method of claim 3, further comprising:

writing the output file to a location specified by a user.

5. A method for capturing data during a print process, the method comprising:

displaying on a graphical user interface a source document for denoting information to be parsed therefrom;

graphically indicating on the graphical user interface at least one source location in the source document for parsing information therefrom;

observing a print command issued by an application for a particular printer;

reading the spool file written to memory in response to the print command, wherein the spool file is written in an Extended Metafile Format (EMF) which is printer independent;

parsing information from the spool file, wherein the parsing information from the spool file includes parsing information based on a source location;

generating an output file containing the information which has been parsed from the spool file;

modifying the output file to conform to a destination template, wherein the destination template includes a plurality of target zones to print information which has been parsed from the spool file with information to a specific addressee; and converting the output file that was modified into a final print data stream for the particular printer.

6. The method of claim 5, wherein the parsing information from the spool file includes parsing using a source template that defines information in the spool file, wherein the source template is chosen automatically based on the information.

7. A computer readable medium including computer instructions for capturing data during a print process, the computer instructions including instructions for:

displaying on a graphical user interface a destination template for receiving information being parsed from a spool file, wherein in the destination template is an image of the consumable business form with at least one of the target zones for printing at least a portion of the information from the spool file thereon;

graphically indicating on the graphical user interface a plurality of target zones in the destination template for printing the information from the spool file thereon;

observing a print command issued by an application for a particular printer;

reading a spool file written to memory in response to the print command, wherein the spool file is written in an Extended Metafile Format (EMF) which is printer independent;

parsing information from the spool file;

generating an output file containing the information which has been parsed from the spool file;

modifying the output file to conform to a destination template, wherein the destination template includes a plurality of target zones to print information which has been parsed from the spool file with information to a specific addressee; and converting the output file that was modified into a final print data stream for the particular printer.

8. The computer readable medium of claim 7, further comprising:

receiving at least one user customizable settings for instructions on when to use certain formats for the output file, and wherein the generating the output file includes generating the output file in a format based on the customizable settings.

9. The computer readable medium of claim 8, wherein the format of the output file is EMF if the spool file contains image information, and wherein the format of the output file is text format if the spool file does not contain image information.

10. The computer readable medium of claim 9, further comprising:

writing the output file to a location specified by a user.

11. The computer readable medium of claim 7, further comprising:

displaying on a graphical user interface a source document for denoting information to be parsed therefrom; and graphically indicating on the graphical user interface at least one source location in the source document for parsing information therefrom;

wherein the parsing information from the spool file includes parsing information based on a source location.

12. The computer readable medium of claim 11 wherein the parsing information from the spool file includes parsing using a source template that defines information in the spool file, wherein the source template is chosen automatically based on the information.

13. A system for capturing data during a print process, comprising:

a graphical user interface for displaying a destination template for receiving information being parsed from a spool file, wherein in the destination template is an image of the consumable business form with at least one of the target zones for printing at least a portion of the information from the spool file thereon;

a user input device for graphically indicating on the graphical user interface the target zones in the destination template for printing the information from the spool file thereon.

a print command issued by an application for a particular printer;

a spool file written to memory in response to the print command, wherein the spool file is written in an Extended Metafile Format (EMF) which is printer independent a parser that parses information from the spool file;

an output file generated containing the information which has been parsed from the spool file;

a modified output file comprising information in the output file that was modified to conform to the destination template, wherein the destination template includes a plurality of target zones to print information which has been parsed from the spool file with information to a specific addressee; and a processor for converting the output file that was modified into a final print data stream for the particular printer.

14. The system of claim 13, further comprising:

a graphical user interface for receiving at least one user customizable settings for instructions on when to use certain formats for the output file, and wherein the output file is generated in a format based on the customizable settings.

15. The system of claim 14, wherein the format of the output file is EMF if the spool file contains image information, and wherein the format of the output file is text format if the spool file does not contain image information.

16. The system of clam 13 further comprising:

a graphical user interface for displaying on a graphical user interface a source document for denoting information to be parsed therefrom;

a user input device for graphically indicating on the graphical user interface at least one source location in the source document for parsing information therefrom; and wherein the parser parses information from the spool file based on a source location.

17. The system of claim 13, wherein the parsing information from the spool file includes parsing using a source template that defines information in the spool file, wherein the source template is chosen automatically based on the information.

* * * * *